US012039607B2

(12) United States Patent
Feldman et al.

(10) Patent No.: US 12,039,607 B2
(45) Date of Patent: Jul. 16, 2024

(54) CUSTOMIZED RISK RELATIONSHIP USER INTERFACE WORKFLOW

(71) Applicant: HARTFORD FIRE INSURANCE COMPANY, Hartford, CT (US)

(72) Inventors: Julia M. Feldman, West Hartford, CT (US); Sara M. Huber, West Hartford, CT (US); Gopinath Kolanji, Mississauga (CA); Peter F Mello, Bethel, CT (US); Kristen Kelly M'Sadoques, Southington, CT (US); Nanda Kishore Nagamalla, East Granby, CT (US); Dennis D. Pannella, Jr., Oxford, CT (US); Karen S. Pavio, Burlington, CT (US); Ameya Sambari, Simsbury, CT (US); Kenneth J. St. Onge, Newington, CT (US); Michael J Stokes, Rocky Hill, CT (US); Jessica Taggett, Watertown, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 0 days.

(21) Appl. No.: 17/377,584

(22) Filed: Jul. 16, 2021

(65) Prior Publication Data
US 2023/0017739 A1 Jan. 19, 2023

(51) Int. Cl.
G06Q 40/08 (2012.01)
G06N 20/00 (2019.01)
(Continued)

(52) U.S. Cl.
CPC ............. *G06Q 40/08* (2013.01); *G06N 20/00* (2019.01); *G06Q 10/10* (2013.01); *G06Q 30/0611* (2013.01)

(58) Field of Classification Search
CPC .... G06Q 40/08; G06Q 10/10; G06Q 30/0611; G06N 20/00
See application file for complete search history.

(56) References Cited

U.S. PATENT DOCUMENTS 7,246,070 B2   7/2007  Schwartz et al.
7,451,097 B1  11/2008  Faupel et al.
(Continued)

Primary Examiner — Jessica Lemieux
Assistant Examiner — Pierre L Maccagno
(74) Attorney, Agent, or Firm — Buckley, Maschoff & Talwalkar LLC

(57) ABSTRACT

A computer server receives, from a remote user device, information about a new potential risk relationship customer (including at least one new user parameter). Based on the new user parameter, the computer server accesses third-party data and utilizes a stored procedure to read data about the new potential risk relationship customer from an internal table of cloud data. The data read from the internal table is processed to dynamically evolve a schema and create an incremental view of cloud data. The computer server uses the incremental view to read and output a current batch of cloud data. A user interface workflow is then customized via a machine learning algorithm that processes the information about the new potential risk relationship customer, the third-party data, and the current batch of cloud data. A user information data store can then be updated based on information collected via user interface displays.

18 Claims, 30 Drawing Sheets

(51) Int. Cl.
    *G06Q 10/10*    (2023.01)
    *G06Q 30/0601*    (2023.01)

(56) References Cited

U.S. PATENT DOCUMENTS

| | | |
|---|---|---|
| 8,175,898 B1 | 5/2012 | Legasse et al. |
| 8,219,421 B2 | 7/2012 | Schwartz et al. |
| 8,452,678 B2 | 5/2013 | Feldman et al. |
| 8,655,686 B2 | 2/2014 | Molinsky et al. |
| 8,775,221 B2 | 7/2014 | Feldman et al. |
| 10,282,785 B1 | 5/2019 | Yager et al. |
| 10,482,537 B2 | 11/2019 | Serapin et al. |
| 11,385,821 B1 * | 7/2022 | Abraham ............... G06F 3/067 |
| 2010/0223078 A1 | 9/2010 | Willis et al. |
| 2012/0203577 A1 | 8/2012 | Faupel et al. |
| 2014/0324484 A1 | 10/2014 | Feldman et al. |
| 2016/0042462 A1 * | 2/2016 | Coonrod ............... G06Q 40/08 |
| | | 705/4 |
| 2017/0011466 A1 | 1/2017 | Murikipudi et al. |
| 2017/0300824 A1 * | 10/2017 | Peng ................. G06F 11/3447 |
| 2018/0341839 A1 * | 11/2018 | Malak ................. G06F 40/205 |
| 2019/0012743 A1 * | 1/2019 | Resutek ................ G06Q 40/08 |
| 2019/0156426 A1 * | 5/2019 | Drucker ................ G06Q 40/08 |
| 2020/0134727 A1 * | 4/2020 | Atherton ............... G06Q 40/08 |
| 2020/0193522 A1 * | 6/2020 | Brown ................. G06Q 40/08 |
| 2021/0117923 A1 * | 4/2021 | Gray ............... G06Q 10/06375 |
| 2021/0264535 A1 * | 8/2021 | Hatch ................. G06F 16/288 |
| 2022/0114671 A1 * | 4/2022 | Banks ................... G16Y 40/10 |
| 2022/0188936 A1 * | 6/2022 | Feldman ........... G06Q 30/0203 |

\* cited by examiner

Review Your Property Information

Here's what we found out about your home with public records and third-party data.
Please make sure everything is correct.

CONSTRUCTION
Year Built — 1971
Square Footage — 1,500
Type of Home — Single Family

FOUNDATION
Type — Basement
     Shallow Basement
     No Walkout

ROOF
Year — 2018
Shape — Gable

NEXT 1550

EDIT 1530
EDIT 1530
EDIT 1530

1590
1510
1500

ENTERPRISE SYSTEM
RISK RELATIONSHIP WORK FLOW

CUSTOMIZED RISK RELATIONSHIP USER INTERFACE WORKFLOW

TECHNICAL FIELD

The present application generally relates to computer systems and more particularly to computer systems that are adapted to accurately and/or automatically customize a risk relationship user interface workflow.

BACKGROUND

An enterprise may want to collect information about a new potential risk relationship customer. For example, an insurer might want to collect information about a user in connection with a new automobile or homeowners insurance policy (e.g., a make, model, and year of an automobile or the address, square footage, and roof type of a residential property). Typically, a customer service representative might talk about these details via a telephone call center to collect this information. Increasingly, however, customers may prefer to interact with an enterprise digitally, such as via a smartphone application or web interface. In such cases, user interface workflows may guide the user through the digital collection of risk relationship information (e.g., which questions are asked, in what particular order, and the exact wording that is used to communicate with the user). Note, however, that a user interface workflow that is appropriate for one user might not be optimal with respect to another user (e.g., a younger user, a user who is already an existing customer, etc.).

It would be desirable to provide improved systems and methods to accurately and/or automatically customize a risk relationship user interface workflow. Moreover, the results should be easy to access, understand, interpret, update, etc.

SUMMARY OF THE INVENTION

According to some embodiments, systems, methods, apparatus, computer program code and means are provided to accurately and/or automatically customize a risk relationship user interface workflow in a way that provides fast and useful results and that allows for flexibility and effectiveness when responding to those results.

Some embodiments are directed to a user interface workflow customization system implemented via a back-end application computer server. A computer server receives, from a remote user device, information about a new potential risk relationship customer (including at least one new user parameter). Based on the new user parameter, the computer server accesses third-party data and utilizes a stored procedure to read data about the new potential risk relationship customer from an internal table of cloud data. The data read from the internal table is processed to dynamically evolve a schema and create an incremental view of cloud data. The computer server uses the incremental view to read and output a current batch of cloud data. A user interface workflow is then customized via a machine learning algorithm that processes the information about the new potential risk relationship customer, the third-party data, and the current batch of cloud data. A user information data store can then be updated based on information collected via user interface displays.

Some embodiments comprise: means for receiving, at a back-end application computer server from a remote user device, information about a new potential risk relationship customer of an enterprise, including at least one new user parameter; based on the new user parameter, means for accessing third-party data about the new potential risk relationship customer; means for utilizing a stored procedure of a cloud computing environment curation engine to read data about the new potential risk relationship customer from an internal table of cloud data; means for processing the data read from the internal table to dynamically evolve a schema and create an incremental view of cloud data; means for using the created incremental view to read and output a current batch of cloud data about the new potential risk relationship customer; means for customizing a user interface workflow via a machine learning algorithm that processes the information about the new potential risk relationship customer, the third-party data, and the current batch of cloud data; and means for collecting information, including user parameters, via interactive user interface displays, to be stored in a user information data store in connection with a potential risk relationship, wherein the user information data store contains electronic records associated with users, each electronic record including an electronic record identifier and user parameters.

In some embodiments, a communication device associated with a back-end application computer server exchanges information with remote devices in connection with interactive graphical user interfaces. The information may be exchanged, for example, via public and/or proprietary communication networks.

A technical effect of some embodiments of the invention is an improved and computerized way to accurately and/or customize workflows in a way that provides fast and useful results. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIGS. 13 through 23 illustrate a web-based homeowners insurance workflow in accordance with some embodiments.

DETAILED DESCRIPTION

Figure 1:
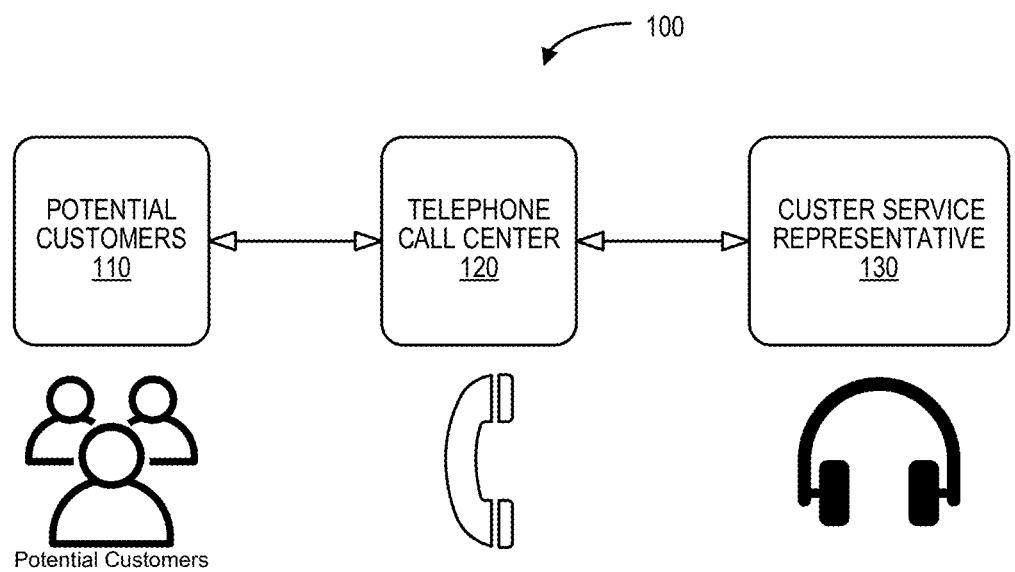
FIG. 1 illustrates a typical customer workflow.

Before the various exemplary embodiments are described in further detail, it is to be understood that the present invention is not limited to the particular embodiments described. It is also to be understood that the terminology used herein is for the purpose of describing particular embodiments only and is not intended to limit the scope of the claims of the present invention.

In the drawings, like reference numerals refer to like features of the systems and methods of the present invention. Accordingly, although certain descriptions may refer only to certain figures and reference numerals, it should be understood that such descriptions might be equally applicable to like reference numerals in other figures.

The present invention provides significant technical improvements to facilitate data processing associated with workflow customization. The present invention is directed to more than merely a computer implementation of a routine or conventional activity previously known in the industry as it provides a specific advancement in the area of electronic record analysis by providing improvements in the operation of a computer system that customizes user interface workflow associated with risk relationships. The present invention provides improvement beyond a mere generic computer implementation as it involves the novel ordered combination of system elements and processes to provide improvements in the speed and accuracy of such user interface customization tool. Some embodiments of the present invention are directed to a system adapted to automatically customize user interface workflows, aggregate user data from multiple sources, automatically optimize user interactions to reduce unnecessary messages or communications, etc. Moreover, communication links and messages may be automatically established, aggregated, formatted, modified, removed, exchanged, etc. to improve network performance (e.g., by reducing an amount of network messaging bandwidth and/or storage required to customize an appropriate risk relationship user interface workflow and/or to collect user data).

An enterprise may want to collect information about a new potential risk relationship customer (e.g., an insurer might want to collect information about a user in connection with a new automobile or homeowners insurance policy). Typically, a customer service representative might talk about these details via a telephone call center to collect this information. For example, FIG. 1 illustrates a such a customer workflow 100. As can be seen, a call service representative 130 talks to potential customers 110 via a telephone call center 120 to collect information associated with a new insurance policy. This type of workflow 100 typically relies on call notes, underwriting referrals, business scripts (e.g., workflows), contextual help (for the customer service representative 130), handles time tracking, and provides an ability to navigate through multiple steps at once. Moreover, the workflow 100 tends to focus on the voice of the customer service representative 130 (e.g., what should I say to the customer (scripting), how can I provide the most accurate quote possible, how do I keep the customer on the phone, is the customer interested in making a purchase, etc.).

Figure 2:
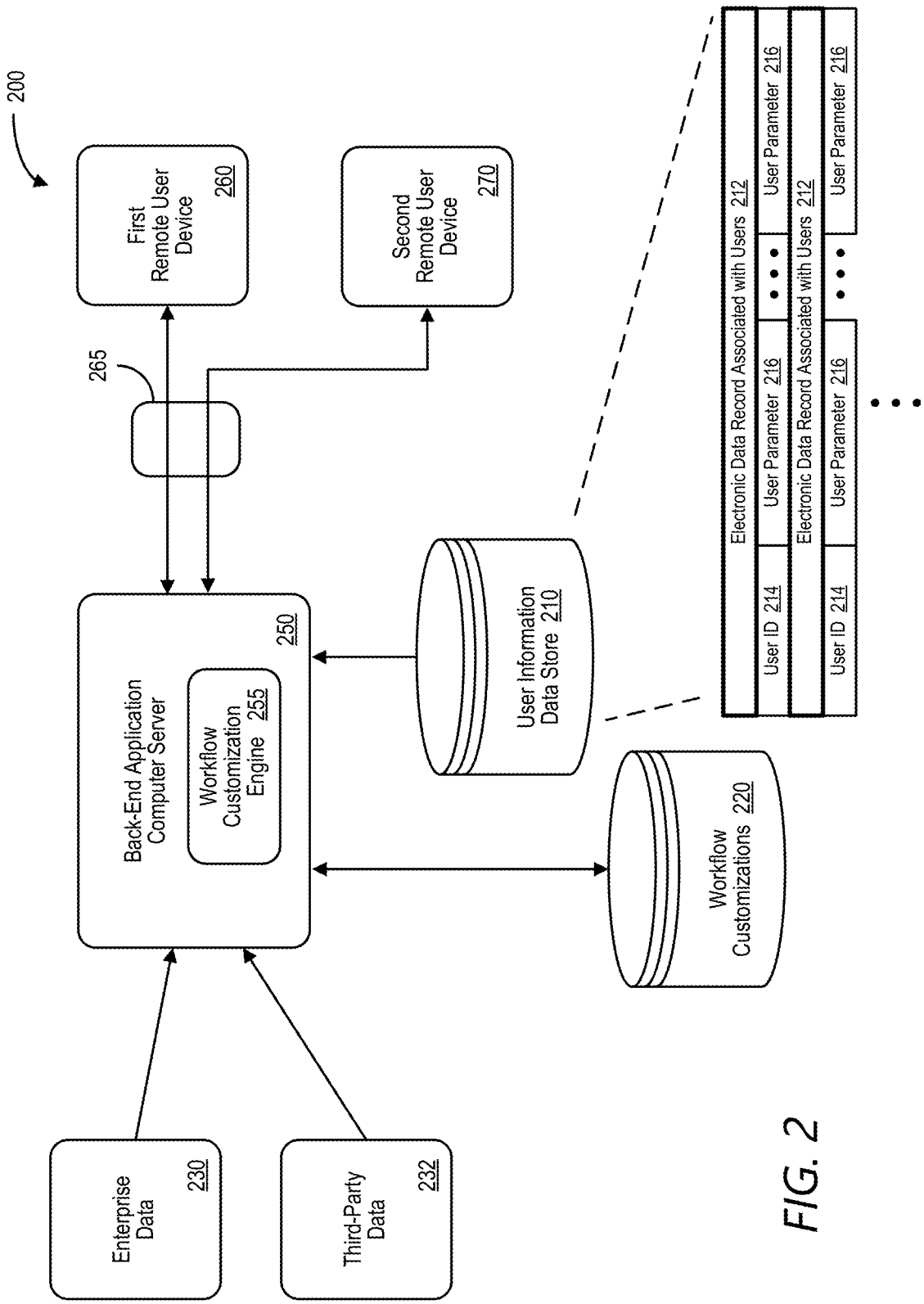
FIG. 2 is a high-level block diagram of a user interface workflow customization system in accordance with some embodiments.

Increasingly, however, customers may prefer to interact with an enterprise digitally, such as via a smartphone application or web interface. In such cases, user interface workflows may guide the user through the digital collection of risk relationship information. Note, however, that a user interface workflow that is appropriate for one user might not be optimal with respect to another user. FIG. 2 is a high-level block diagram of a user interface workflow customization system 200 according to some embodiments of the present invention. In particular, the system 200 includes a back-end application computer server 250 that may access information in a user information data store 210 (e.g., storing a set of electronic records associated with users 212, each record including, for example, one or more user identifiers 214, user parameters 216, etc.). The back-end application computer server 250 may also store information into other data stores, such as workflow customizations 220 and utilize a workflow customization engine 255 to view, analyze, and/or update the electronic records. The back-end application computer server 250 may also exchange information with a first remote user device 260 and a second remote user device 270 (e.g., via a firewall 265). According to some embodiments, an interactive graphical user interface platform of the back-end application computer server 250 (and, in some cases, enterprise data 230 and/or third-party data 232) may facilitate forecasts, decisions, predictions, and/or the display of results via one or more remote administrator computers (e.g., to identify an optimized resource allocation) and/or the remote user devices 260, 270. For example, the first remote user device 260 may transmit annotated and/or updated information to the back-end application computer server 250. Based on the updated information, the back-end application computer server 250 may adjust data in the user information data store 210 and/or the workflow customizations 220 and the change may (or may not) be used in connection with the second remote user device 270. Note that the back-end application computer server 250 and/or any of the other devices and methods described herein might be associated with a third party, such as a vendor that performs a service for an enterprise.

The back-end application computer server 250 and/or the other elements of the system 200 might be, for example, associated with a Personal Computer ("PC"), laptop computer, smartphone, an enterprise server, a server farm, and/or a database or similar storage devices. According to some embodiments, an "automated" back-end application computer server 250 (and/or other elements of the system 200) may facilitate the automated access and/or update of electronic records in the workflow customizations 220. As used herein, the term "automated" may refer to, for example, actions that can be performed with little (or no) intervention by a human.

As used herein, devices, including those associated with the back-end application computer server 250 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 250 may store information into and/or retrieve information from the user information data store 210 and/or the workflow customizations 220. The data elements 210, 220 may be locally stored or reside remote from the back-end application computer server 250. As will be described further below, the user information data store 210 may be used by the back-end application computer server 250 in connection with an interactive user interface to access and update electronic records. Although a single back-end application computer server 250 is shown in FIG. 2, any number of such devices may be included. Moreover, various devices described herein might be combined according to embodiments of the present invention. For example, in some embodiments, the back-end application computer server 250 and user information data store 210 might be co-located and/or may comprise a single apparatus.

Figure 3:
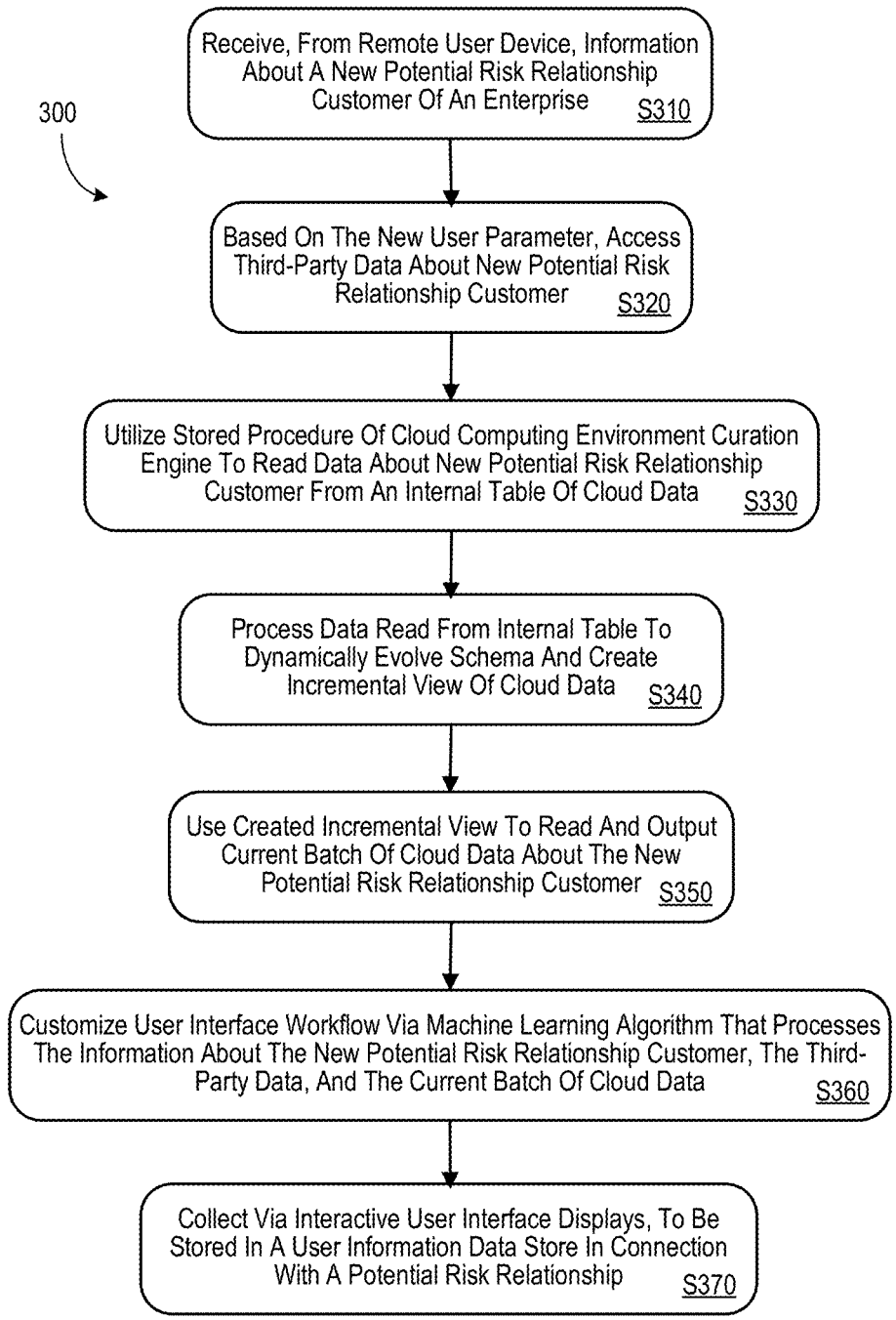
FIG. 3 illustrates a workflow customization method according to some embodiments of the present invention.

Note that the system 200 of FIG. 2 is provided only as an example, and embodiments may be associated with additional elements or components. According to some embodiments, the elements of the system 200 automatically transmit information associated with an interactive user interface display over a distributed communication network. FIG. 3 illustrates a method 300 that might be performed by some or all of the elements of the system 200 described with respect to FIG. 2, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, a back-end application computer server may receive, from a remote user device, information about a new potential risk relationship customer of an enterprise (including at least one new user parameter, such as a user's name, date of birth, home address, age, etc.). Based on the new user parameter, the system may access third-party data about the new potential risk relationship customer at S320. At S330, the system may utilize a stored procedure of a cloud computing environment curation engine to read data about the new potential risk relationship customer from an internal table of cloud data. At S340, the system may process the data read from the internal table to dynamically evolve a schema and create an incremental view of cloud data and then use the created incremental view to read and output a current batch of cloud data about the new potential risk relationship customer at S350.

At S360, the system may customize a user interface workflow via a machine learning algorithm that processes the information about the new potential risk relationship customer, the third-party data, and the current batch of cloud data. As used herein, the phrase "machine learning algorithm" might be associated with, for example, artificial intelligence, data mining, optimization, generalization, supervised learning, unsupervised learning, semi-supervised learning, reinforcement learning, dimensionality reduction, etc. In addition, as used herein the phrase "workflow" can refer to various user interaction experiences, such as an order of questions on the interface, a wording of questions on the interface, a selection of questions on the interface, an online-to-offline handoff process, etc. According to some embodiment, a workflow might be customized with respect to a graphical presentation of the interface to the customer (e.g., including drawings, animations, video clips, a color scheme, etc.). Note that any of the user interface workflow customizations described herein may be generated using models executed in substantially real-time (e.g., by an enterprise front-end application) to dynamically tailor the experience for the potential customer "on-the-fly." For example, an answer to a question on one user interface display might alter the appearance of questions on the next display presented to the potential customer.

Moreover, a workflow might be associated with an insurer and the risk relationship may be a potential insurance policy (e.g., the workflow might be associated automobile insurance, homeowners insurance, an insurance bundle, etc.). For example, the user interface workflow might collection information about a policy renewal, a potential insurance claim event, insurance claims processing, etc. According to some embodiments, the user interface workflow leads to an insurance premium quote for the new potential insurance policy customer of the insurer.

At S370, the system may collect information, including user parameters, via interactive user interface displays. This information may then be stored in a user information data store in connection with a potential risk relationship and customized workflow. The user information data store might, for example, contain electronic records associated with users (and each electronic record may include an electronic record identifier and user parameters).

Figure 4:
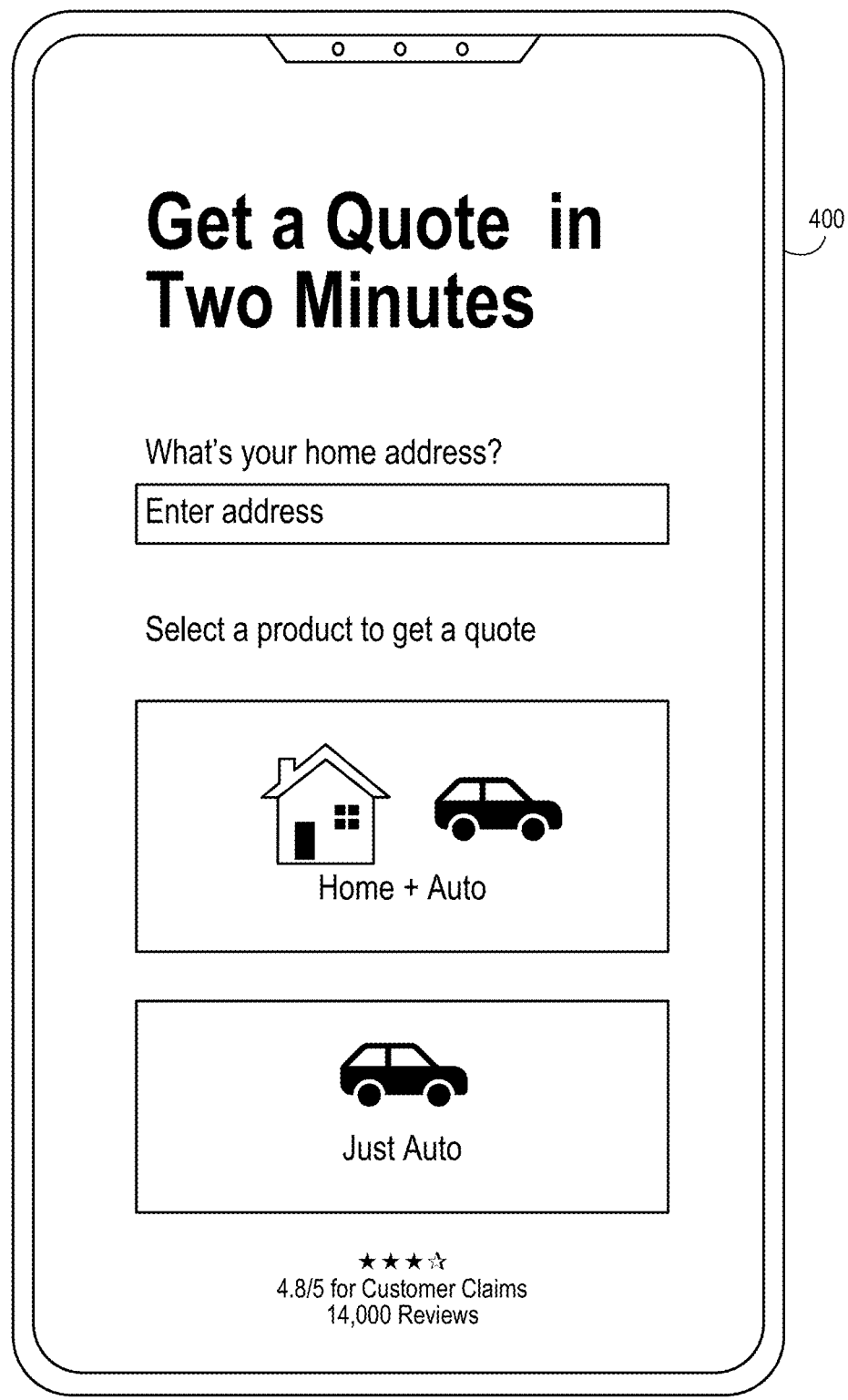
FIGS. 4 through 6 illustrate smartphone user interfaces associated with automobile insurance in accordance with some embodiments.
Figure 5:
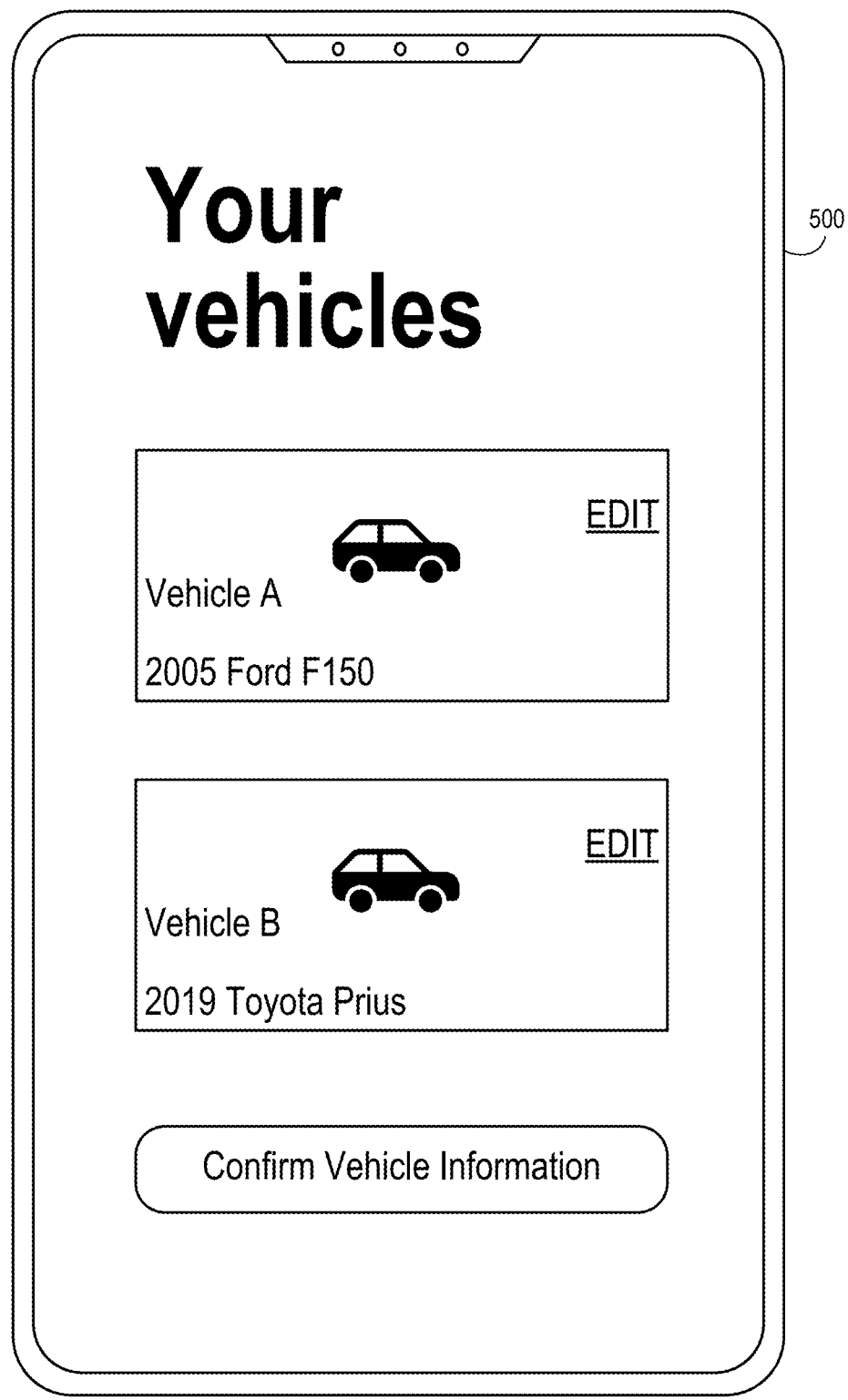
Figure 6:
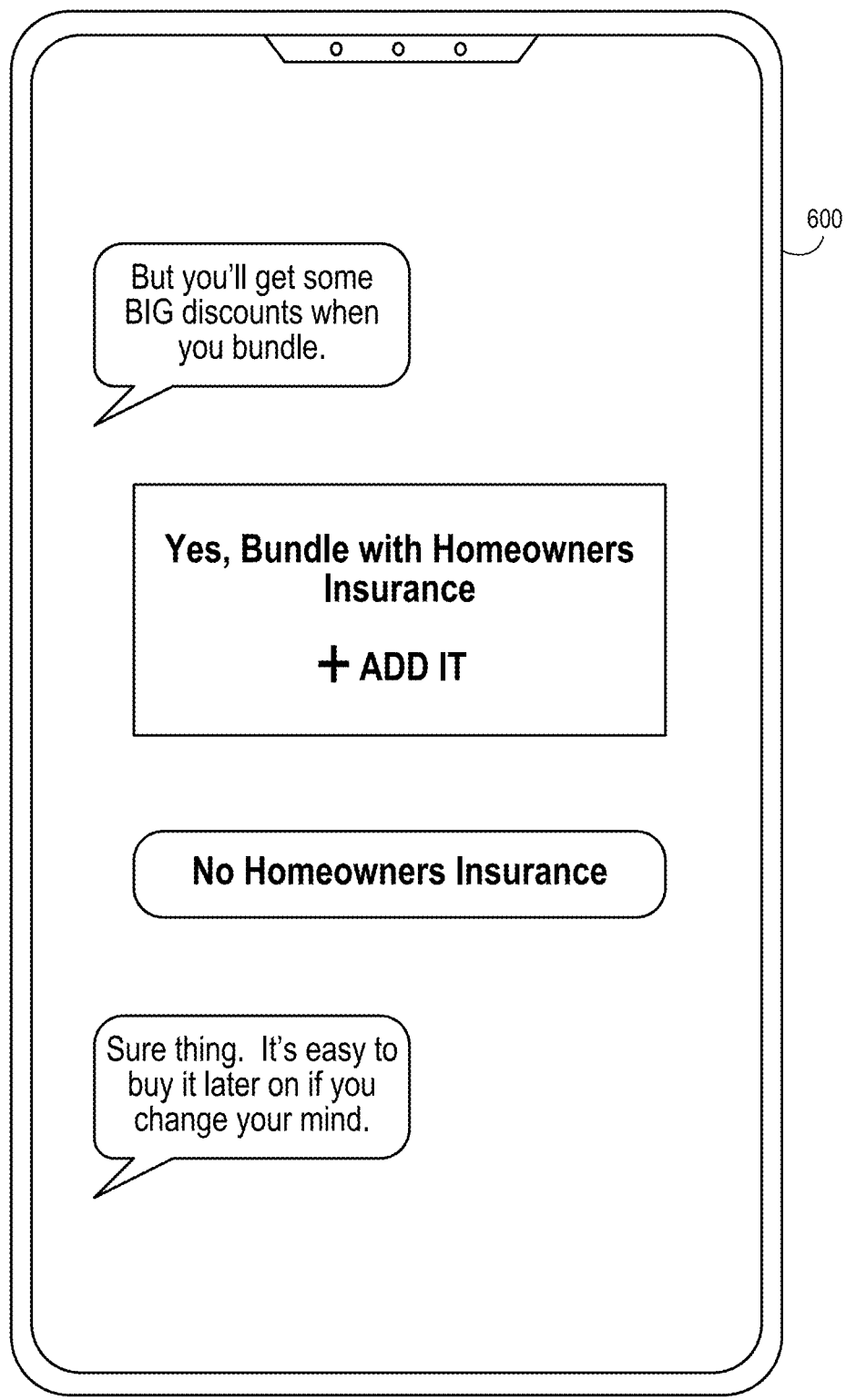

FIGS. 4 through 6 illustrate smartphone user interfaces associated with automobile insurance in accordance with some embodiments. In particular, FIG. 4 is a display 400 that might be used to begin the process of requesting an automobile insurance quote. According to some embodiments, the system can begin gathering third-party data after collecting only the user's name, home address, and date of birth. The third-party data may be used, for example, to prefill rating elements and to reduce the number of user information collection questions.

The user might then provide information about one or more vehicles using a display 500 such as the one illustrated in FIG. 5. Selection of an "Edit" icon for each vehicle may let the user adjust the make, model, year of that automobile, etc. Note that optional features and coverages may are available to fit various user's needs. Moreover, customers can choose how to balance cost versus value. FIG. 6 illustrates a display 600 that might be used to provide an additional offer (e.g., an insurance package or bundle) to the user during the information collection process. According to some embodiments, buying a policy online will be similar to the check-out process that users are familiar with at online retail stores. Moreover, once purchased the customer can add their insurance to a digital wallet in their smartphone operating system.

Figure 7:
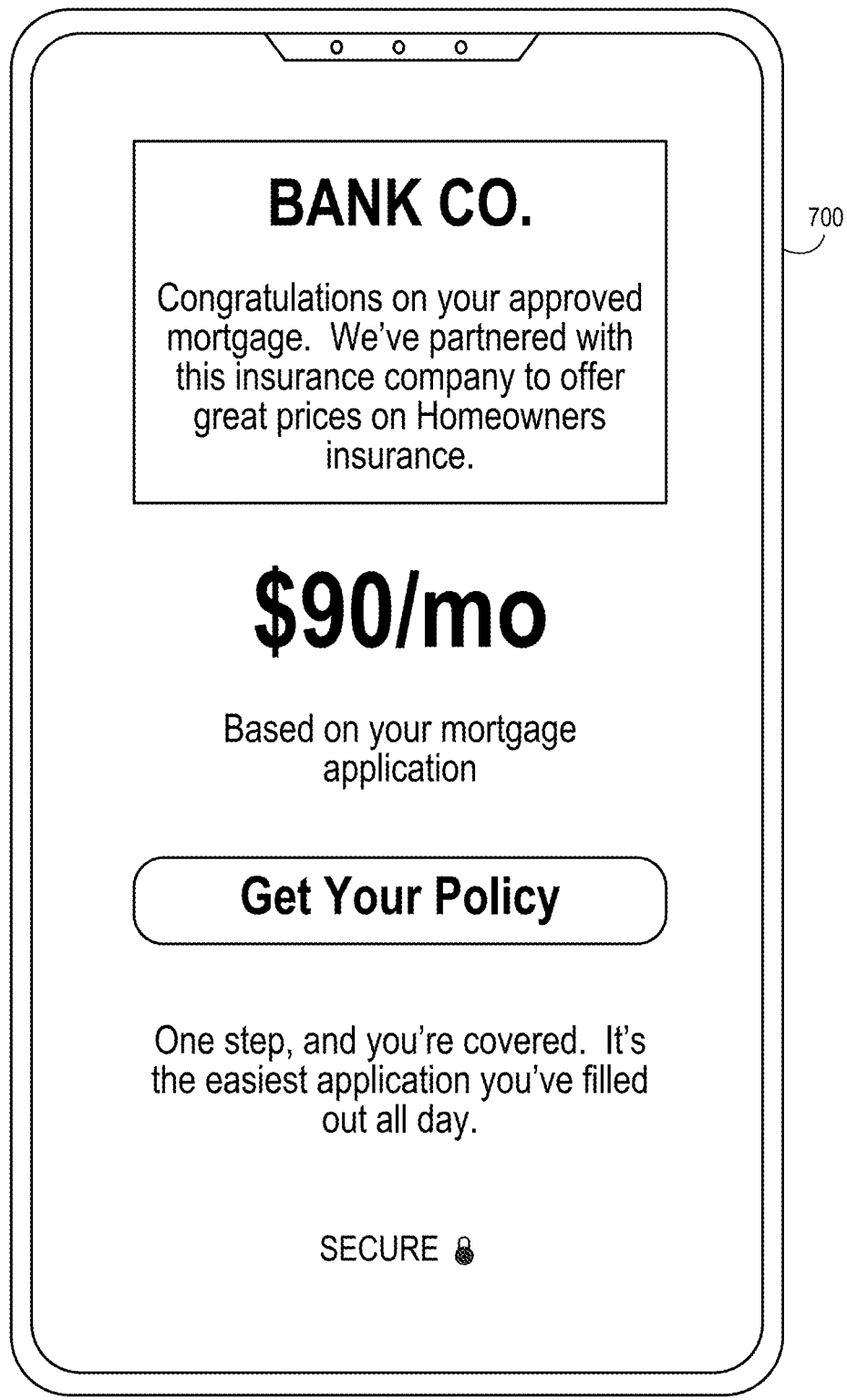
FIGS. 7 through 12 illustrate other smartphone user interface features according to various embodiments.
Figure 8:
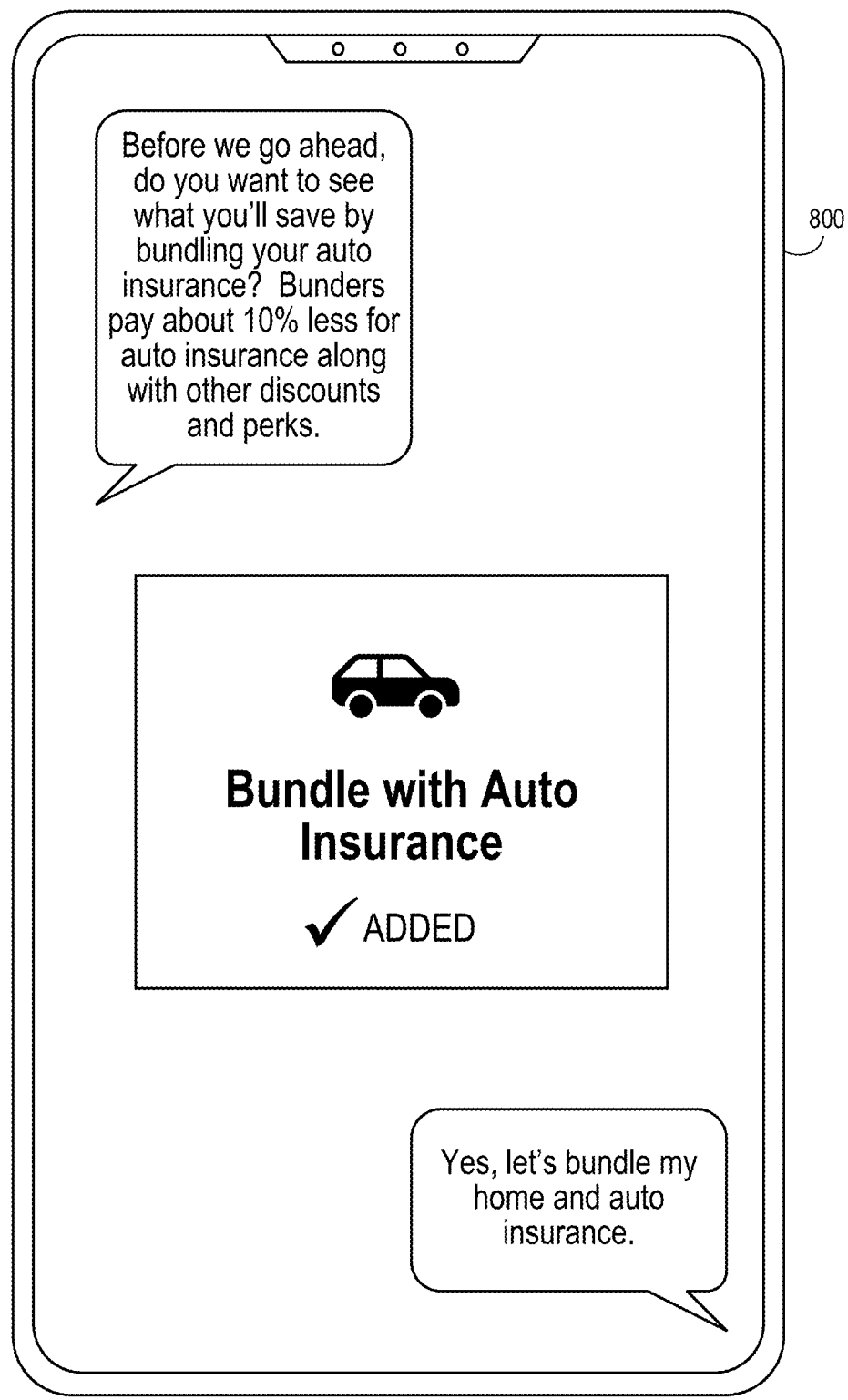

FIGS. 7 through 12 illustrate other smartphone user interface features according to various embodiments. In particular, FIG. 7 shows a display 700 that may be used to provide an insurance quote to a user. For example, after refinancing a mortgage a customer may see a pre-prepared home quote enabled via Application Programming Interface ("API") information exchanged between the bank and the insurer. Clicking on the offer may let the customer refine their quote (e.g., on a web site of the insurer. According to some embodiments, bank information, enterprise information (e.g., if the potential insurance customer already purchases another type of insurance from the insurer) and/or third-party data may be used to generate "quick quote" premium values without receiving any additional information from the potential insurance customer. FIG. 8 shows a display 800 that may be used to offer an insurance bundle to a user. Choosing to bundle may be a relatively simple process, and when third-party data is not available a customer might scan something with his or her smartphone camera (e.g., a driver's license) to provide additional inputs that can be used to automatically gather information and prefill portions of a user information record.

Figure 9:
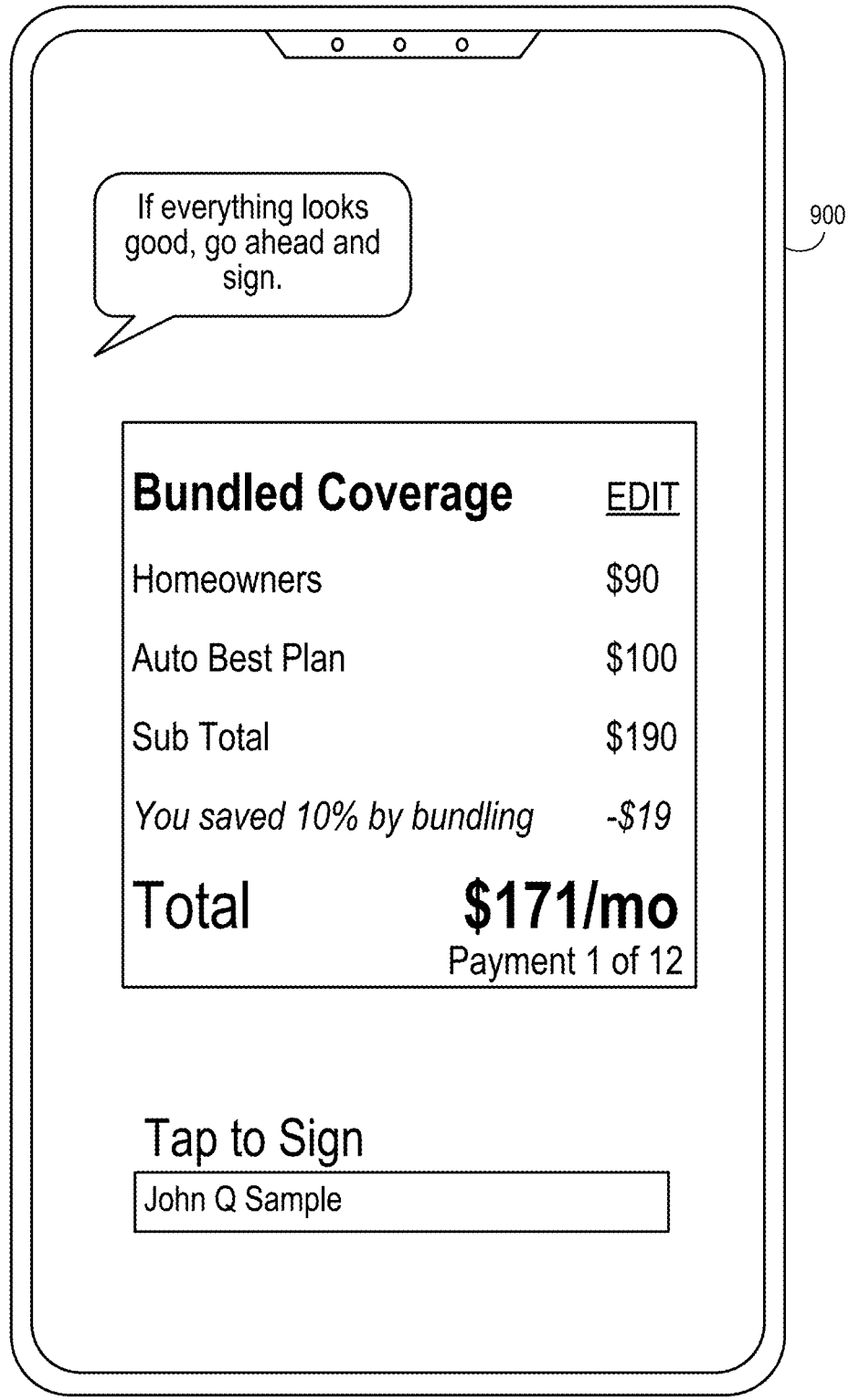
Figure 10:
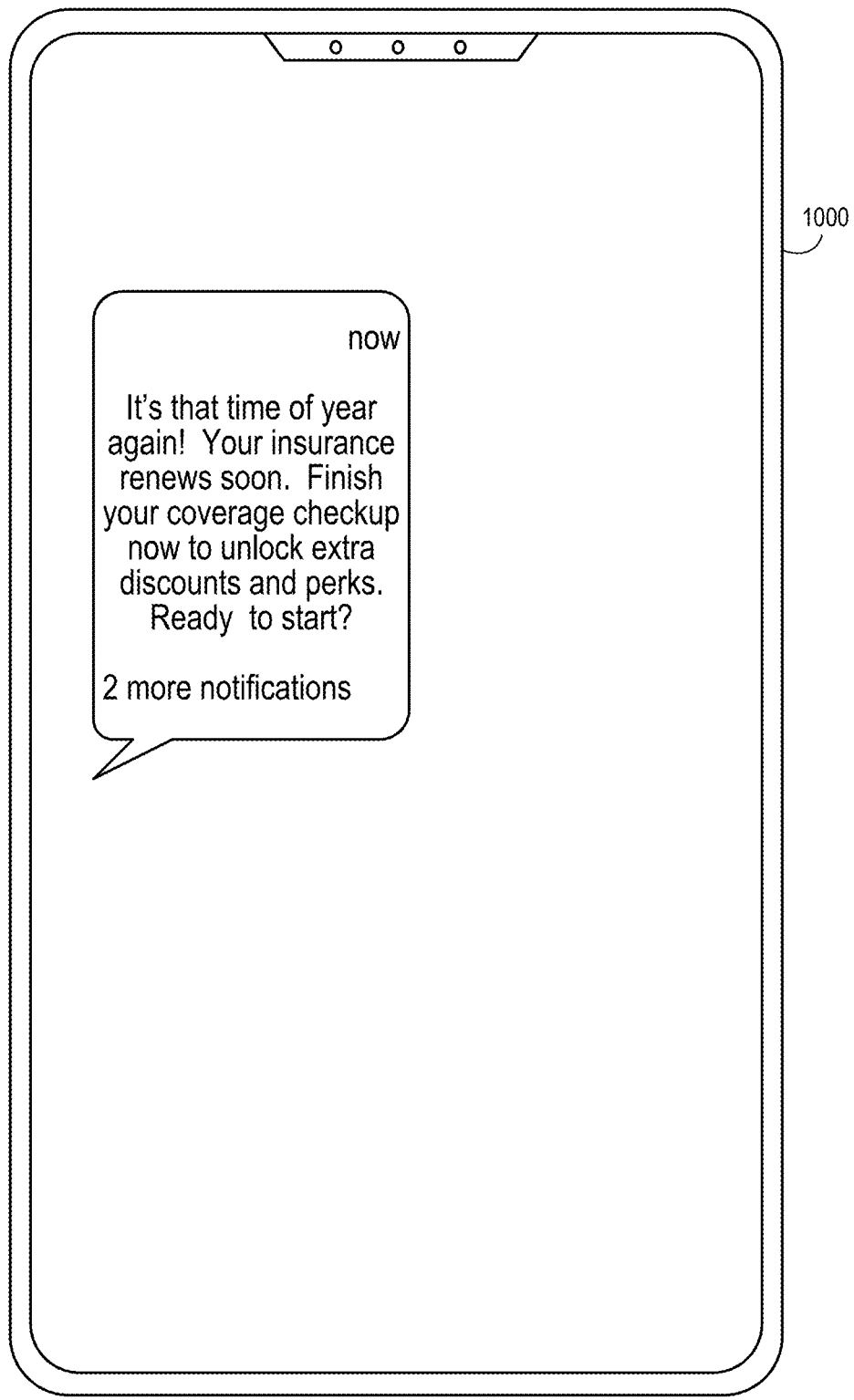

FIG. 9 shows a display 900 that may be used to finalize the purchase of an insurance package. According to some embodiments, purchasing insurance may be as easy as digitally signing the policy (e.g., via a "Tap to Sign" icon) and using a smartphone payment feature. That is, the mobile application may enable quick and effortless self-service options available anytime, anywhere. In some embodiments, a rewards program may be offered to gives customer a reason to engage beyond paying the insurance bill. FIG. 10 shows a display 1000 that may be used to communicate with a user after he or she has purchased insurance. In particular, the insurer may anticipate insurance renewal and proactively reach out with an Artificial Intelligence ("AI") powered chatbot for a coverage check-in via the display 1000. At their own pace, customers can explore discounts, ask questions, and/or request help via the display 1000.

Figure 11:
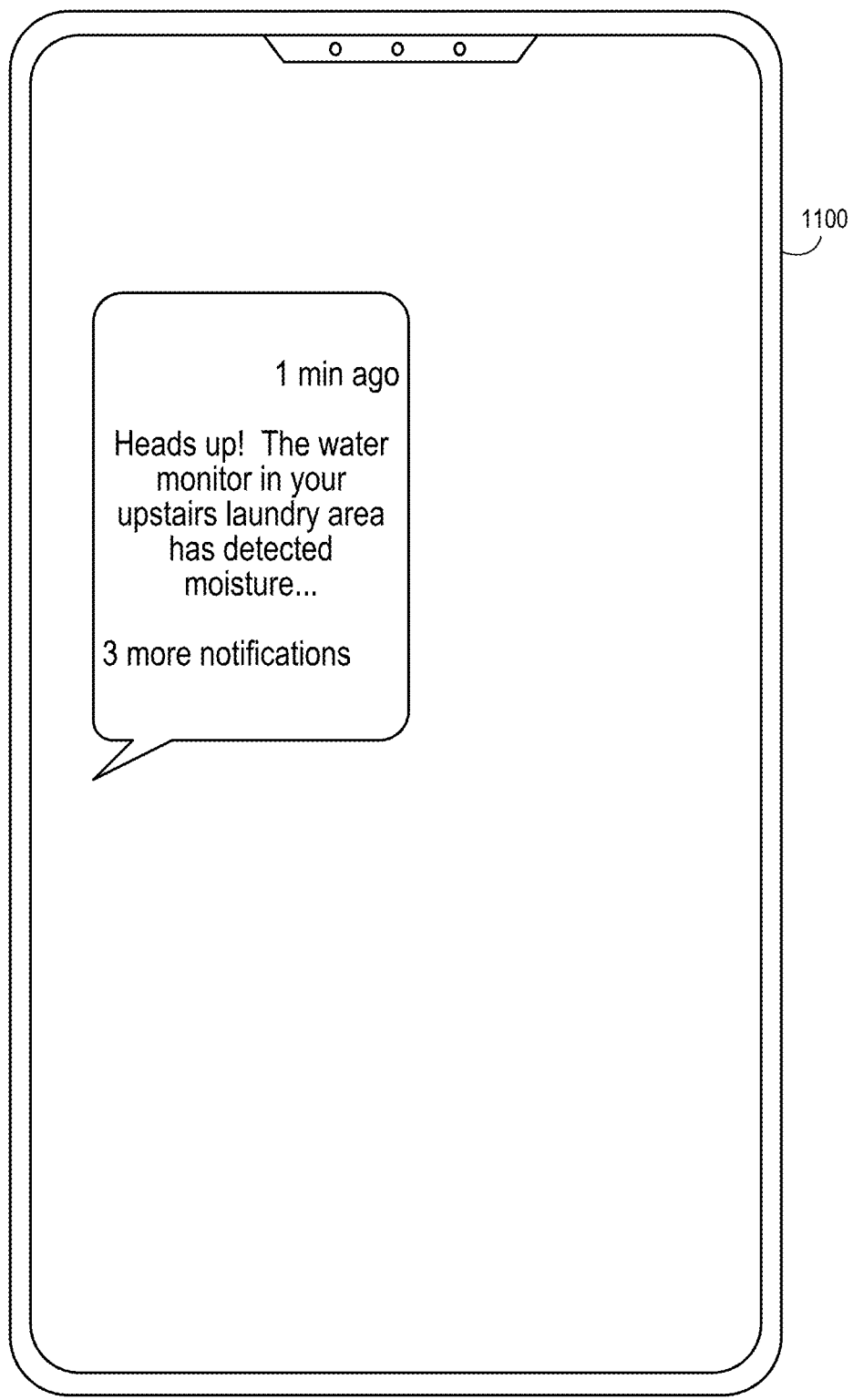
Figure 12:
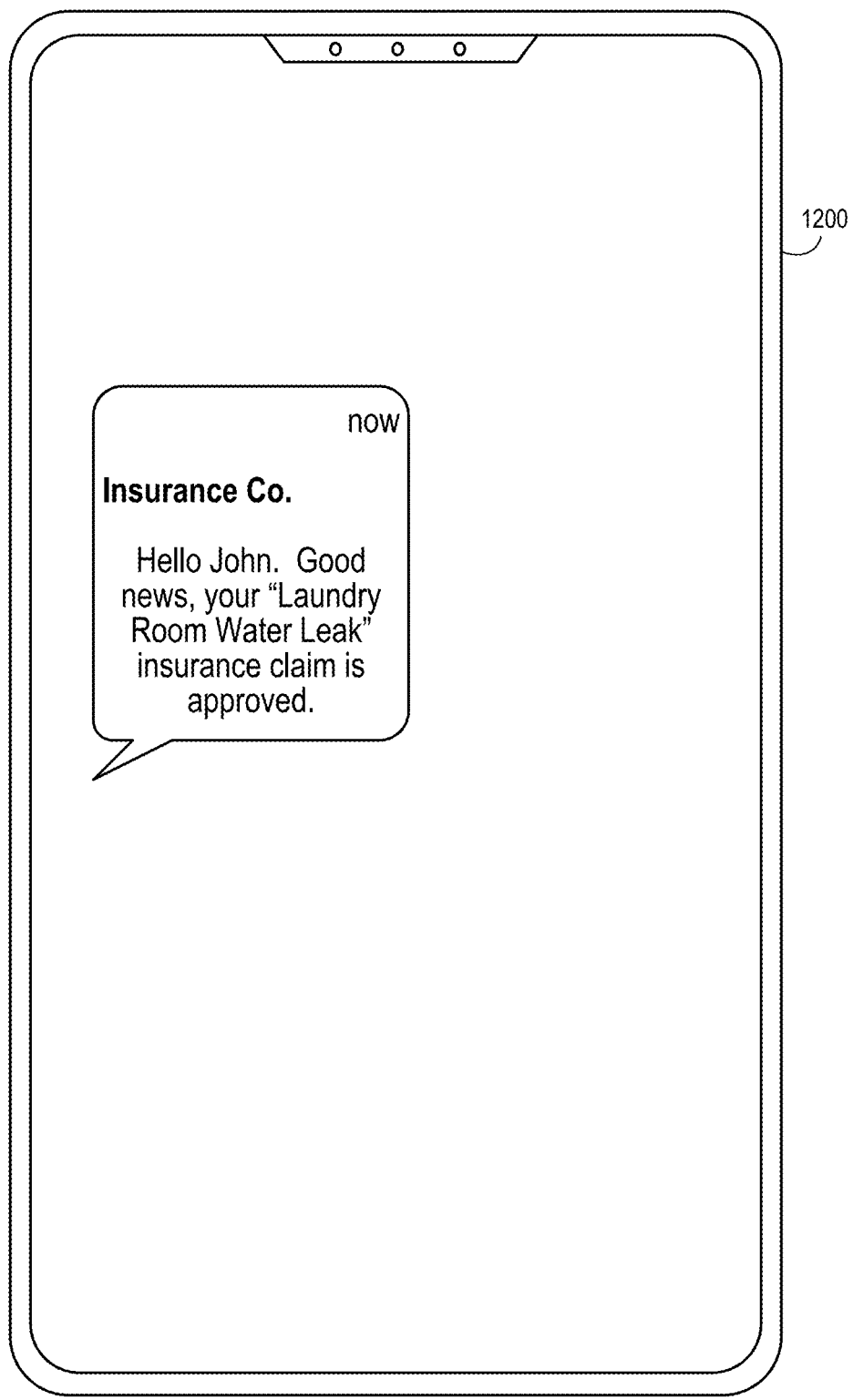

FIG. 11 shows a display 1100 that might be provided to alert a user in substantially real time that a potential insurance event has occurred (or is occurring). In this way, a customer's stressful situation in their home may be made easier via the digital channel. The use of the display 1100 might also mean faster and more efficient insurance claim routing, improved processing time, and/or quicker resolution of the event and/or insurance claim. For example, FIG. 12 shows a display 1200 that may be used to update a user about an insurance claim resolution process. As time passes, the customer may be able to send and receive updates about the claim via the display 1200. The insurer can also keep customers informed about how they can use insurance coverage (e.g., to obtain temporary housing).

Figure 13:
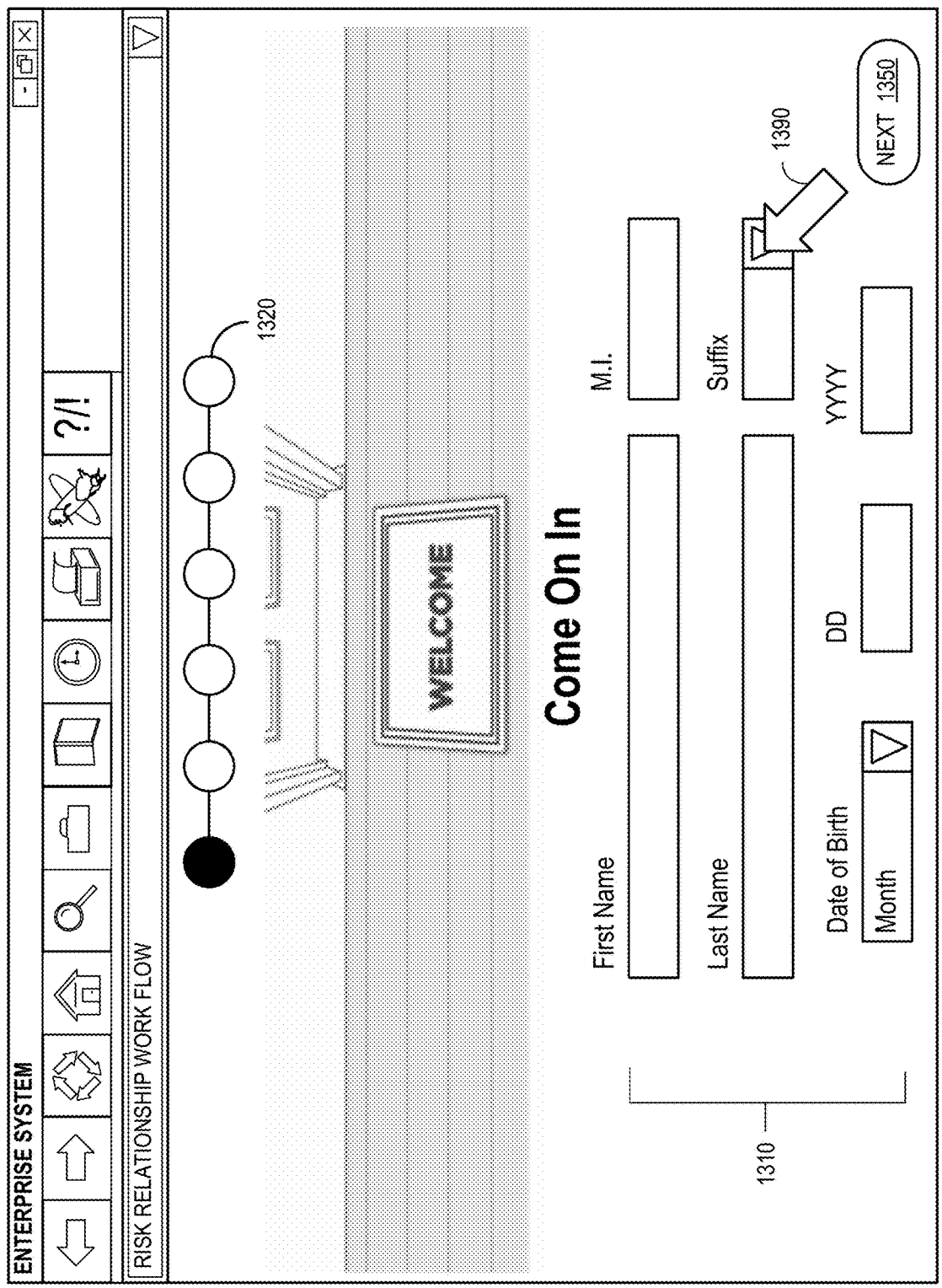

FIGS. 13 through 23 illustrate a web-based homeowners insurance workflow in accordance with some embodiments. In particular, FIG. 13 illustrates a welcome screen 1300 with a data entry area 1310 that can be used to collect initial information from the user. The data entry area 1310 may be used, for example, to collect a users' name, date of birth (e.g., via touchscreen or computer mouse pointer 1390). A navigation bar 1320 may indicate where in the workflow the display 1300 is located. Selection of a "Next" icon 1350 may submit the information and move to the interface in the workflow.

Figure 14:
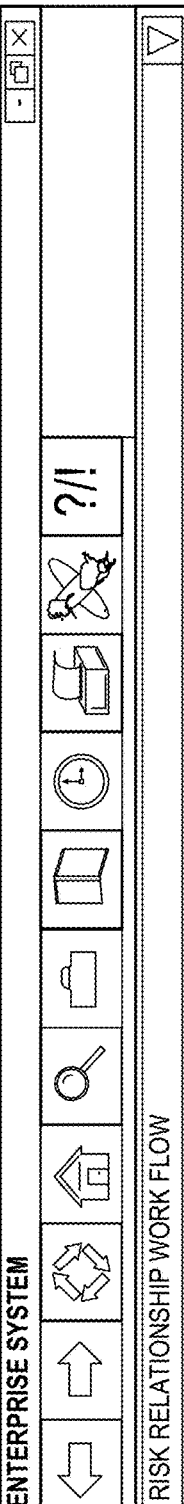

FIG. 14 illustrates a home address screen 1400 with a data entry area 1410 that can be used to collect address information about a property from the user. The data entry area 1410 may be used, for example, to collect a street, city, state (e.g., via touchscreen or computer mouse pointer 1490), ZIP code, rental status, etc. Selection of a "Next" icon 1450 may submit the information and move to the interface in the workflow.

FIG. 15 illustrates a property display 1500 with a data display area 1510 that can be used to provide information about a property being insured by the user (e.g., which may be pre-populated with third-party data). The data display area 1510 may be used, for example, to provide construction information, foundation information, roof information, etc. Selection of an "Edit" icon 1530 (e.g., via touchscreen or computer mouse pointer 1590) may let the user adjust the property information (e.g., when the third-party data was incorrect for some reason). Selection of a "Next" icon 1550 may submit the information and move to the interface in the workflow.

Figure 16:
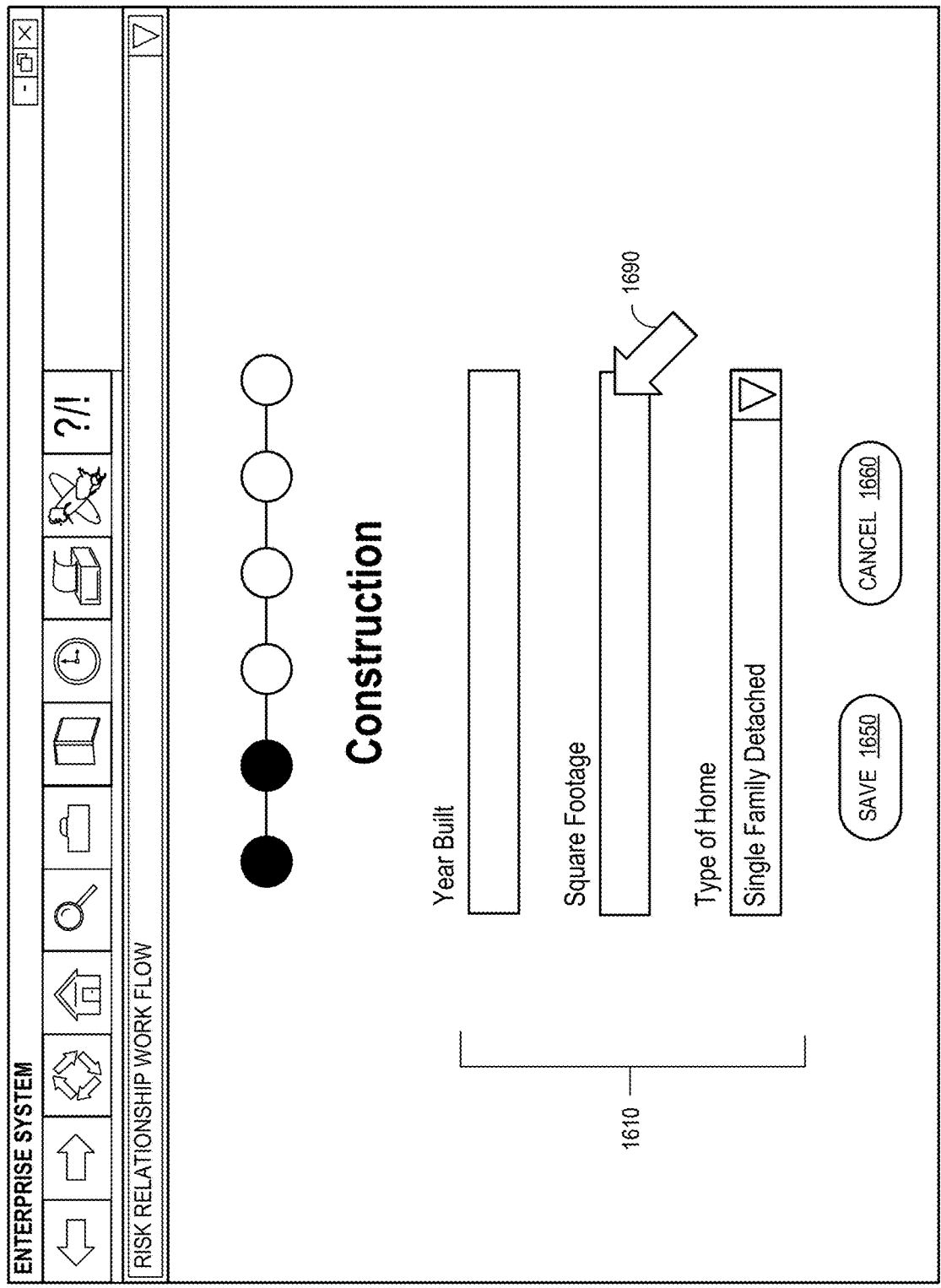
Figure 17:
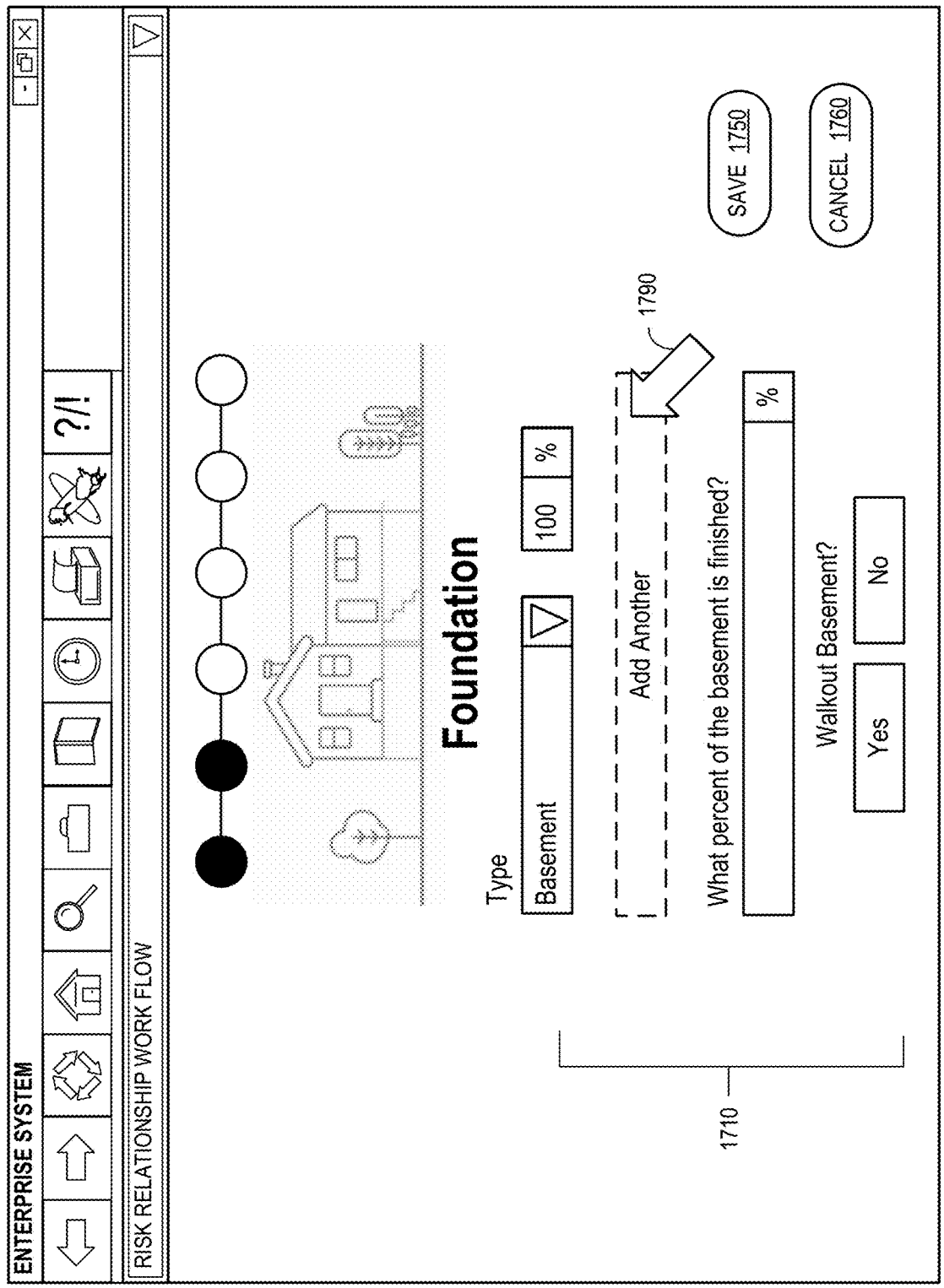
Figure 18:
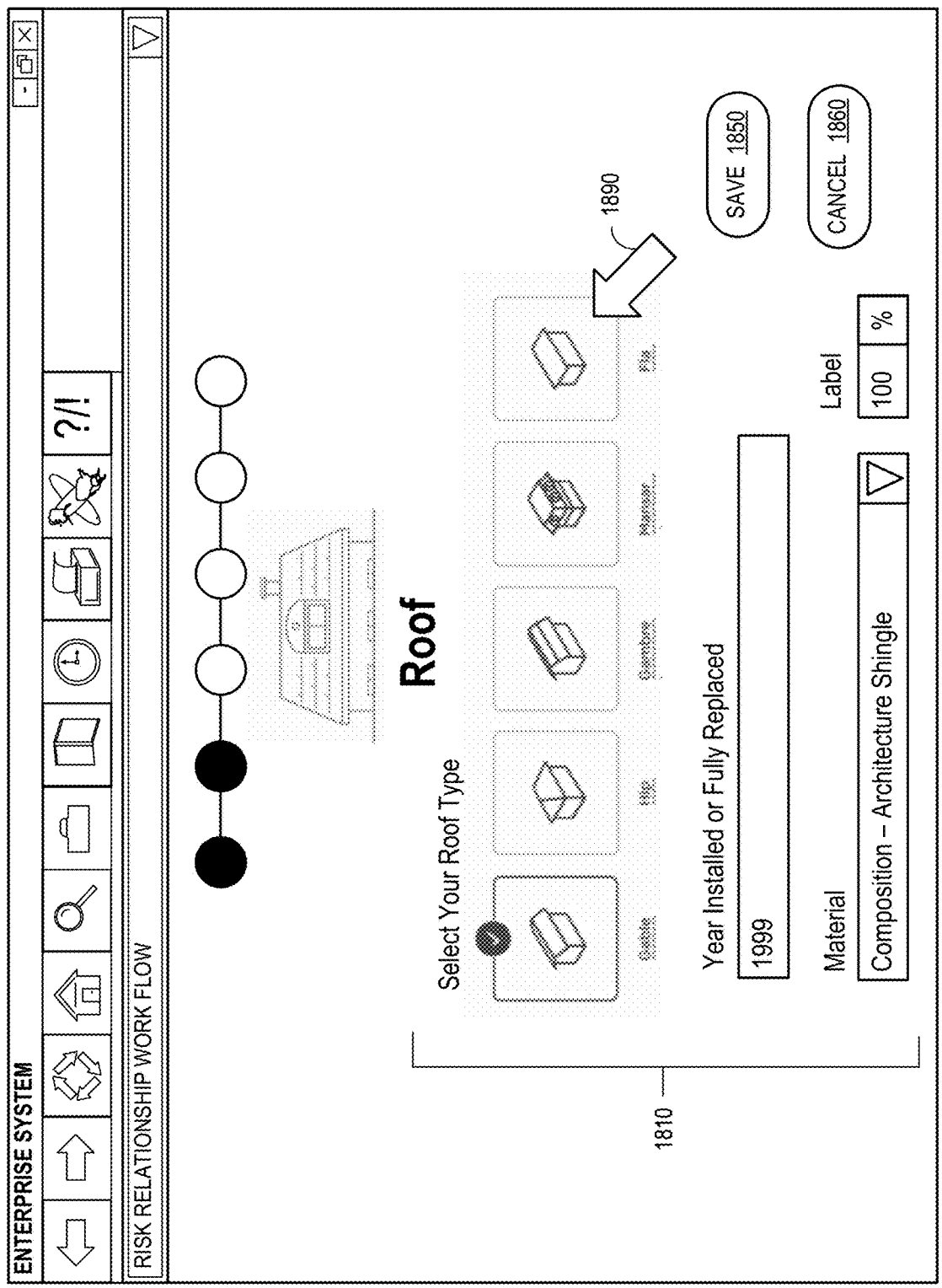
Figure 19:
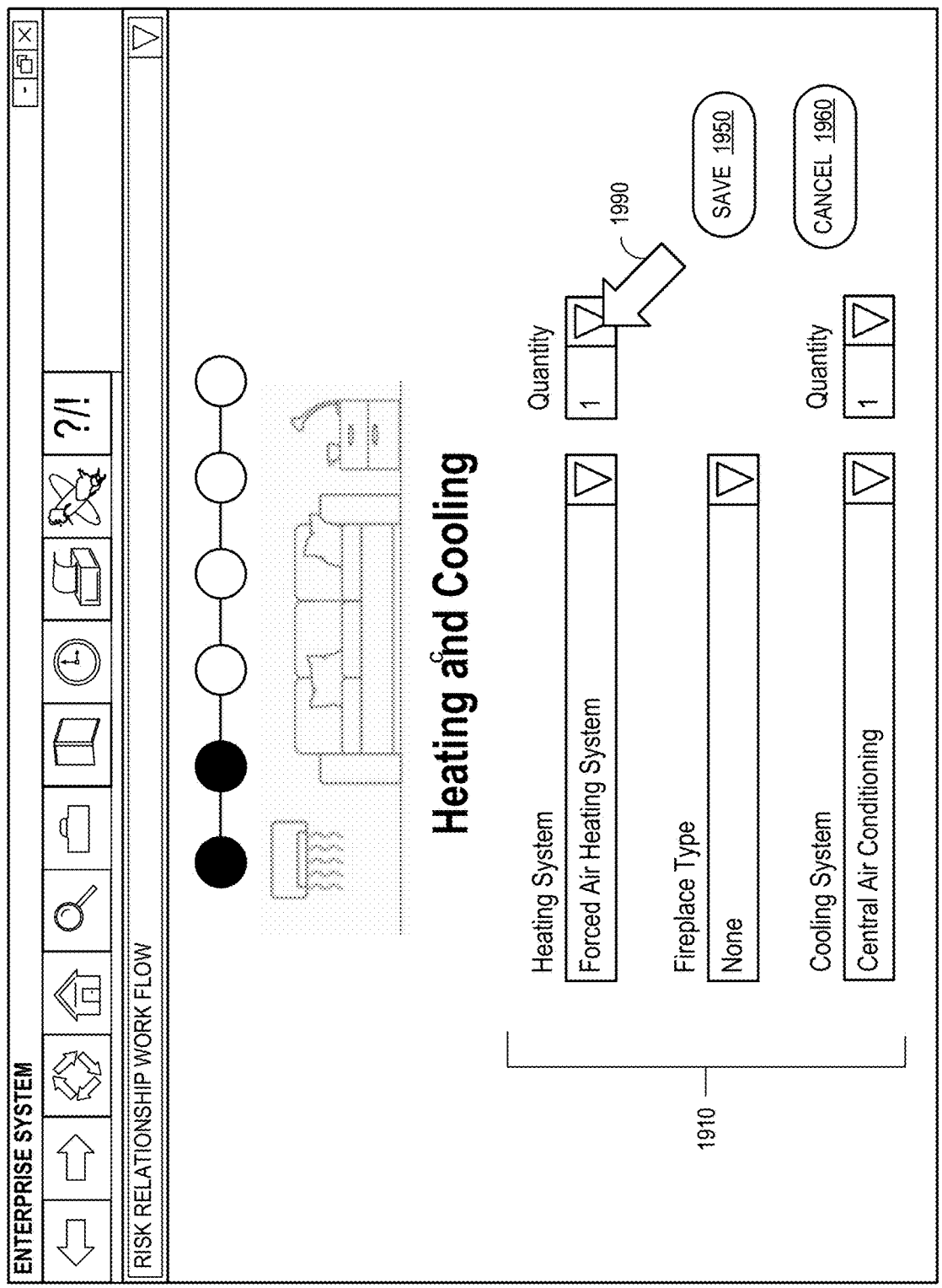
Figure 20:
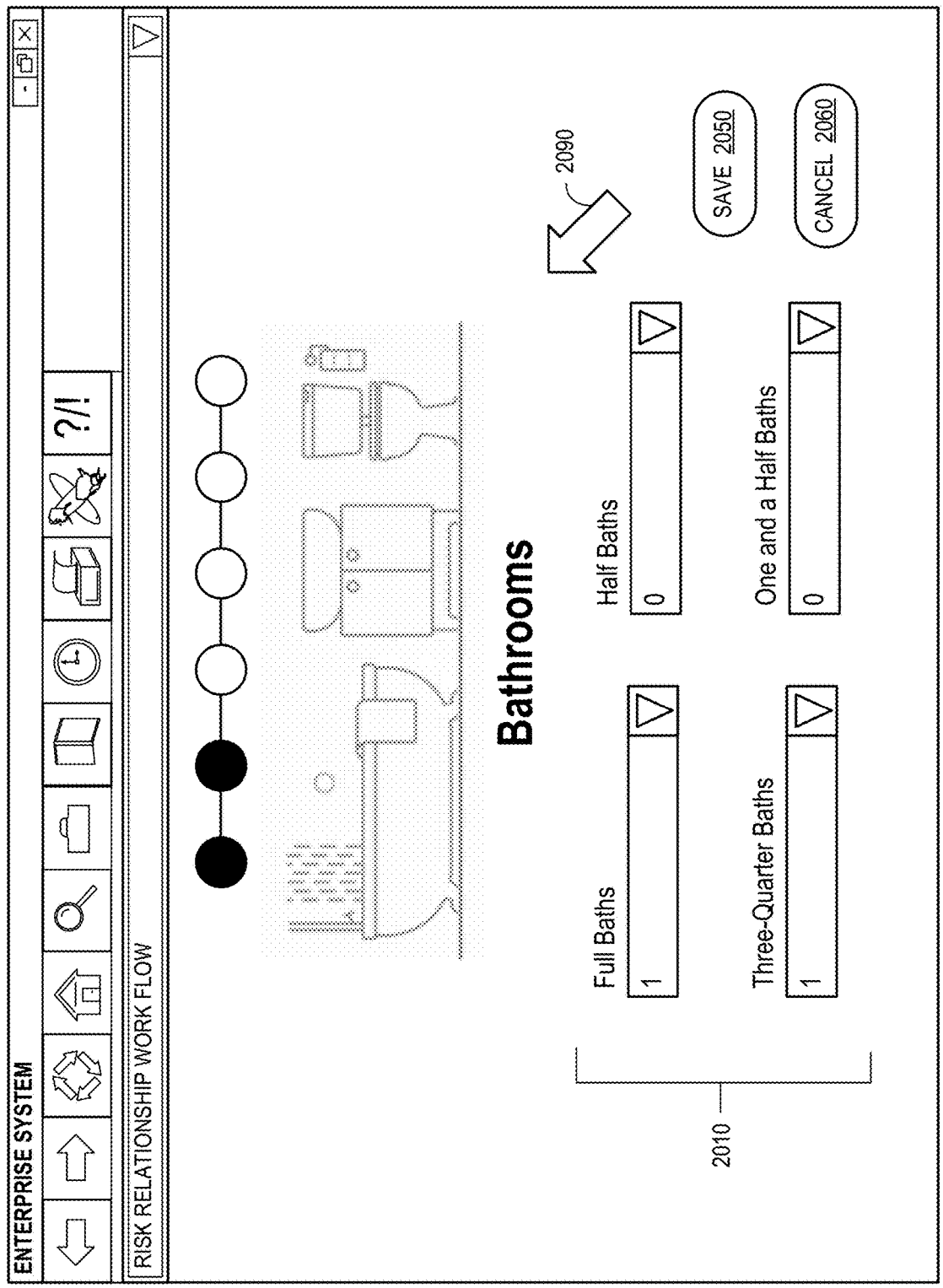
Figure 21:
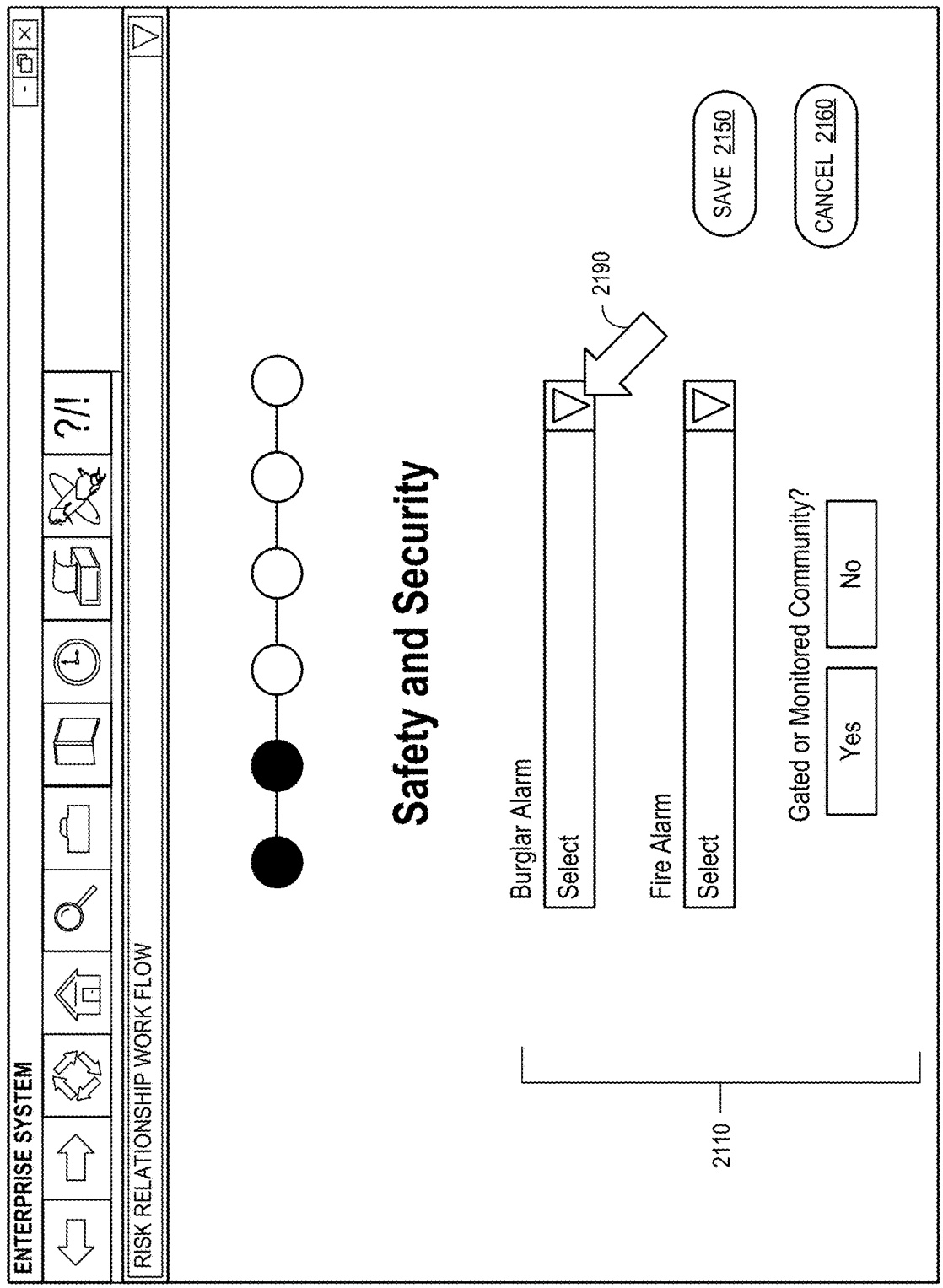

For example, selection of the "Edit" icon 1530 next to the construction information may result in display of a construction display 1600 as illustrated in FIG. 16. The construction display 1600 includes a data entry area 1610 that can be used to collect corrected construction information from the user. The data entry area 1610 may be used, for example, to collect the year a property was build, square footage information, a type of home, etc. (e.g., via touchscreen or computer mouse pointer 1690). Selection of a "Save" icon 1650 may submit the information and return to the property display 1500. Selection of a "Cancel" icon 1660 may return to the property display 1500 without submitting the adjusted information. Selection of the "Edit" icon 1530 next to the foundation information on the property display 1500 may result in display of a foundation display 1700 as illustrated in FIG. 17. The foundation display 1700 includes a data entry area 1710 that can be used to collect adjusted foundation information from the user. The data entry area 1710 may be used, for example, to collect a foundation type (e.g., via touchscreen or computer mouse pointer 1790), finished basement information, walkout information, etc. Selection of a "Save" icon 1750 may submit the information and return to the construction display 1500. Selection of a "Cancel" icon 1760 may return to the property display 1500 without submitting the adjusted information. Selection of the "Edit" icon 1530 next to the roof information on the property display 1500 may result in display of a roof display 1800 as illustrated in FIG. 18. The roof display 1800 includes a data entry area 1810 that can be used to collect adjusted roof information from the user. The data entry area 1810 may be used, for example, to collect a graphical roof type (e.g., via touchscreen or computer mouse pointer 1890), a year of installation or replacement, a roof material, etc. Selection of a "Save" icon 1850 may submit the information and return to the construction display 1500. Selection of a "Cancel" icon 1860 may return to the property display 1500 without submitting the adjusted information.

Note that information other than that illustrated in FIGS. 15 through 21 might be included on the property display 1500. For example, a heating and cooling display 1900 includes a data entry area 1910 that can be used to collect corrected safety and security information from the user. The data entry area 1910 may be used, for example, to collect a type and number of heating systems (e.g., via touchscreen or computer mouse pointer 1990), a fireplace type, a type and number of cooling systems, etc. Selection of a "Save" icon 1950 may submit the information and return to the property display 1500. Selection of a "Cancel" icon 1960 may return to the property display 1500 without submitting the adjusted information. A bathrooms display 2000 includes a data entry area 2010 that can be used to collect adjusted bathroom information from the user. The data entry area 2010 may be used, for example, to collect a number of full baths (e.g., via touchscreen or computer mouse pointer 2090), a number of half baths, a number of three-quarter baths, a number of one and a half baths, etc. Selection of a "Save" icon 2050 may submit the information and return to the property display 1500. Selection of a "Cancel" icon 2060 may return to the property display 1500 without submitting the adjusted information. A safety and security display 2100 includes a data entry area 2110 that can be used to collect adjusted safety and security information from the user. The data entry area 2110 may be used, for example, to collect a burglar alarm type (e.g., via touchscreen or computer mouse pointer 2190), a fire alarm type, an indication of whether the property is in a gated or monitored community, etc. Selection of a "Save" icon 2150 may submit the information and return to the property display 1500. Selection of a "Cancel" icon 2160 may return to the property display 1500 without submitting the adjusted information.

Figure 22:
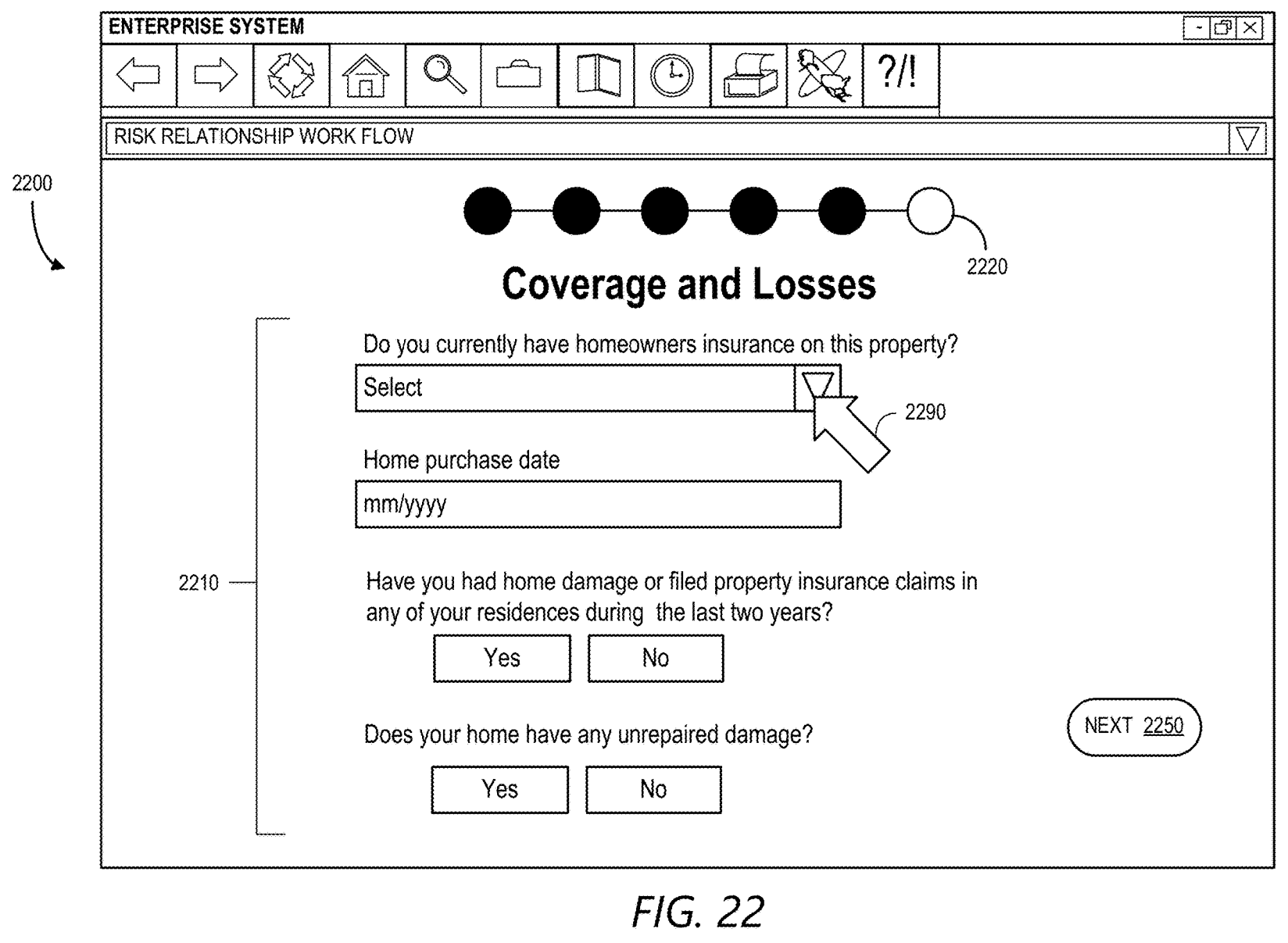

After all of the property information has been confirmed, or adjusted, by the user a coverage and losses display 2200 may be provided as illustrated in FIG. 22. Note that the navigation bar 2220 may reflect that the user is now closer to completion of the quote request process. A data entry area 2210 may be used, for example, to collect an indication of whether or not the user currently has homeowners insurance (e.g., via touchscreen or computer mouse pointer 2290), a home purchase date, information about prior insurance claims and unrepaired damage, etc. Selection of a "Next"

icon 2250 may submit this information to the insurer and complete the insurance quote request process.

Figure 23:
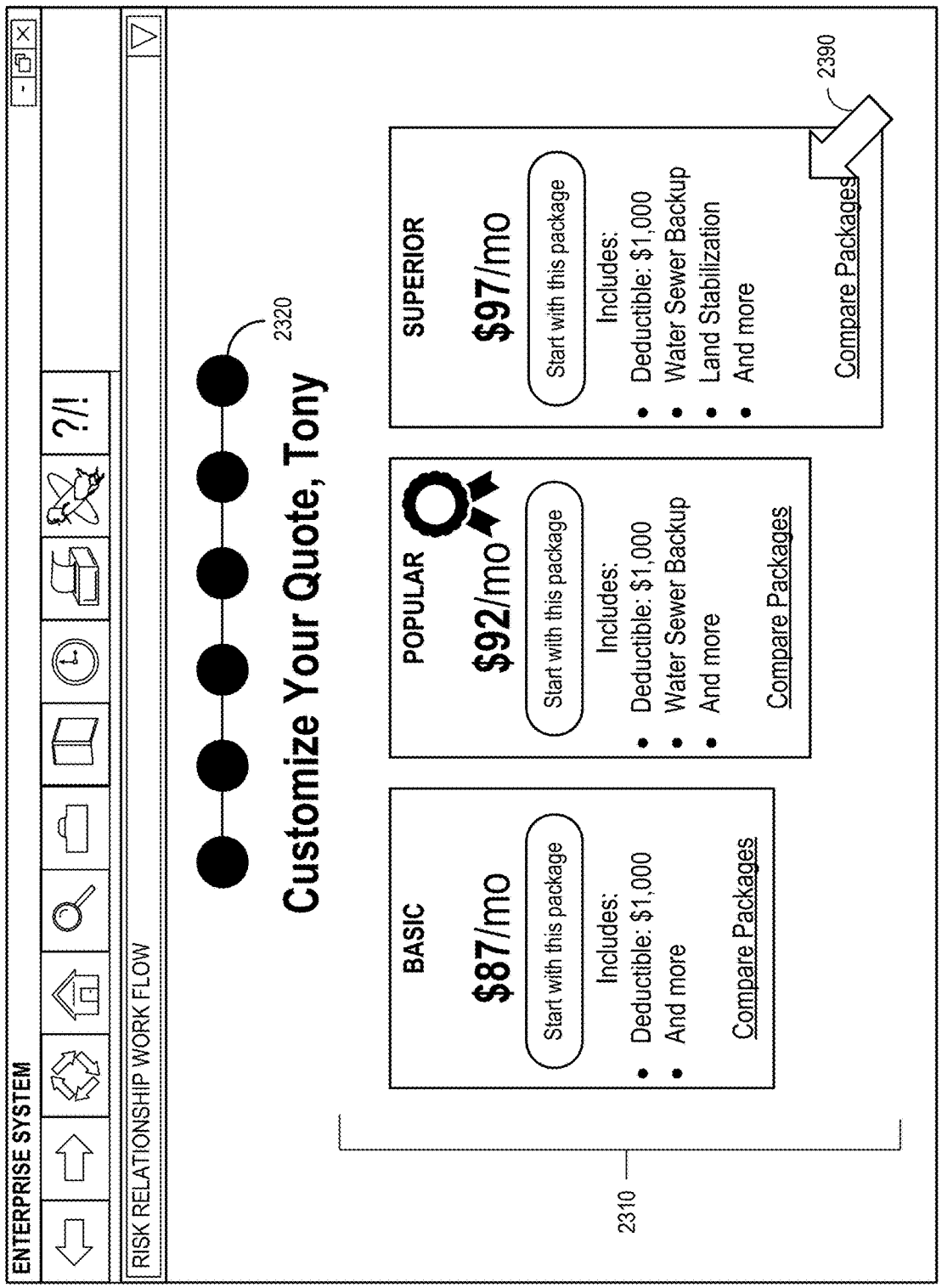

After the insurance quote request process is completed, a quote display 2300 may be provided as illustrated in FIG. 23. The quote display 2300 includes a data display area 2310 that shows a number of insurance options (e.g., basic, popular, and superior) and associated insurance premiums. The user may select various options (e.g., via touchscreen or computer mouse pointer 2390) to view further details (and perhaps purchase the insurance) or to compare multiple packages to each other.

Figure 24A:
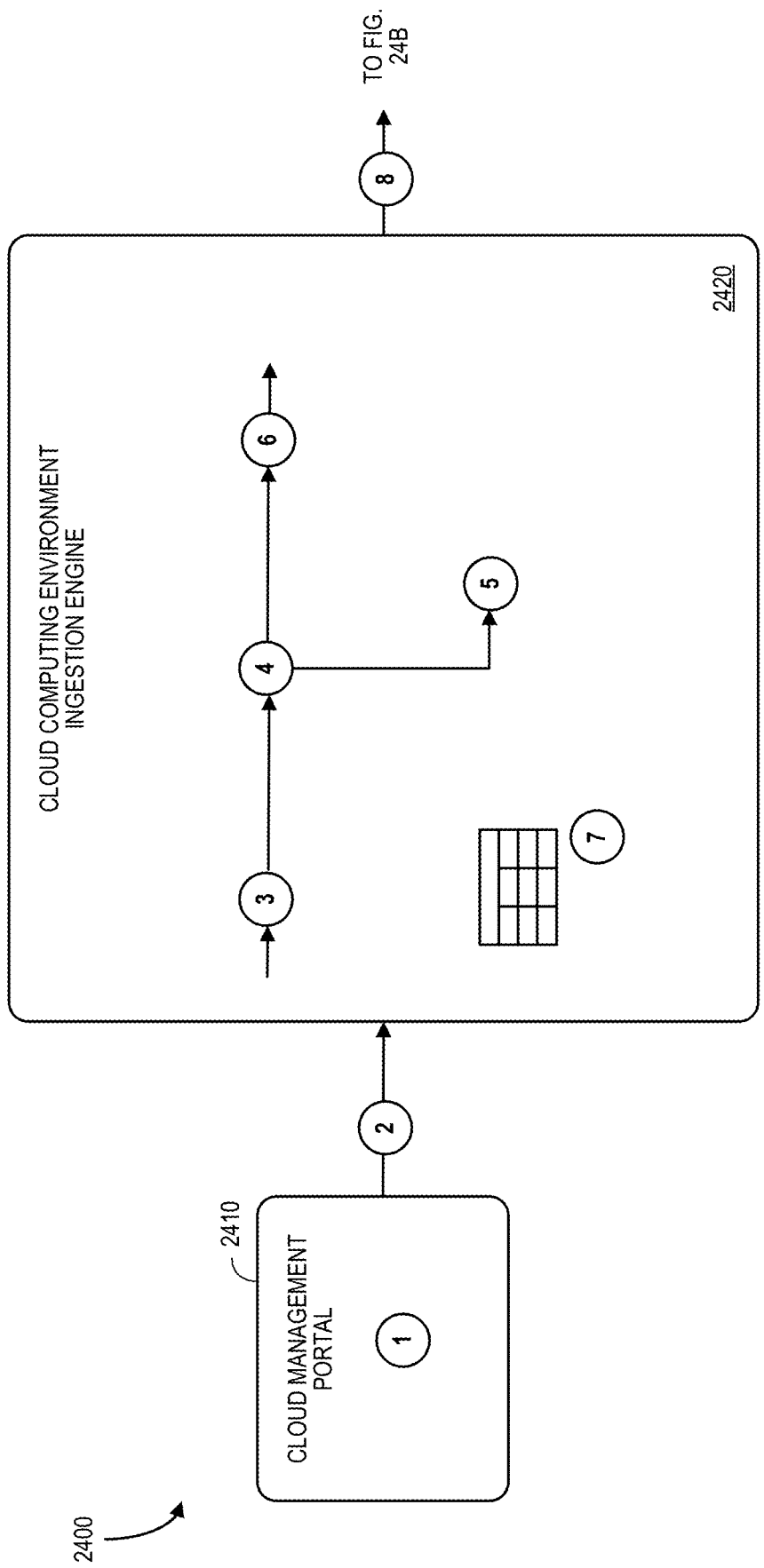
FIGS. 24A and 24B provide an end-to-end data train design and flow for a cloud-based computing environment according to some embodiments.
Figure 24B:
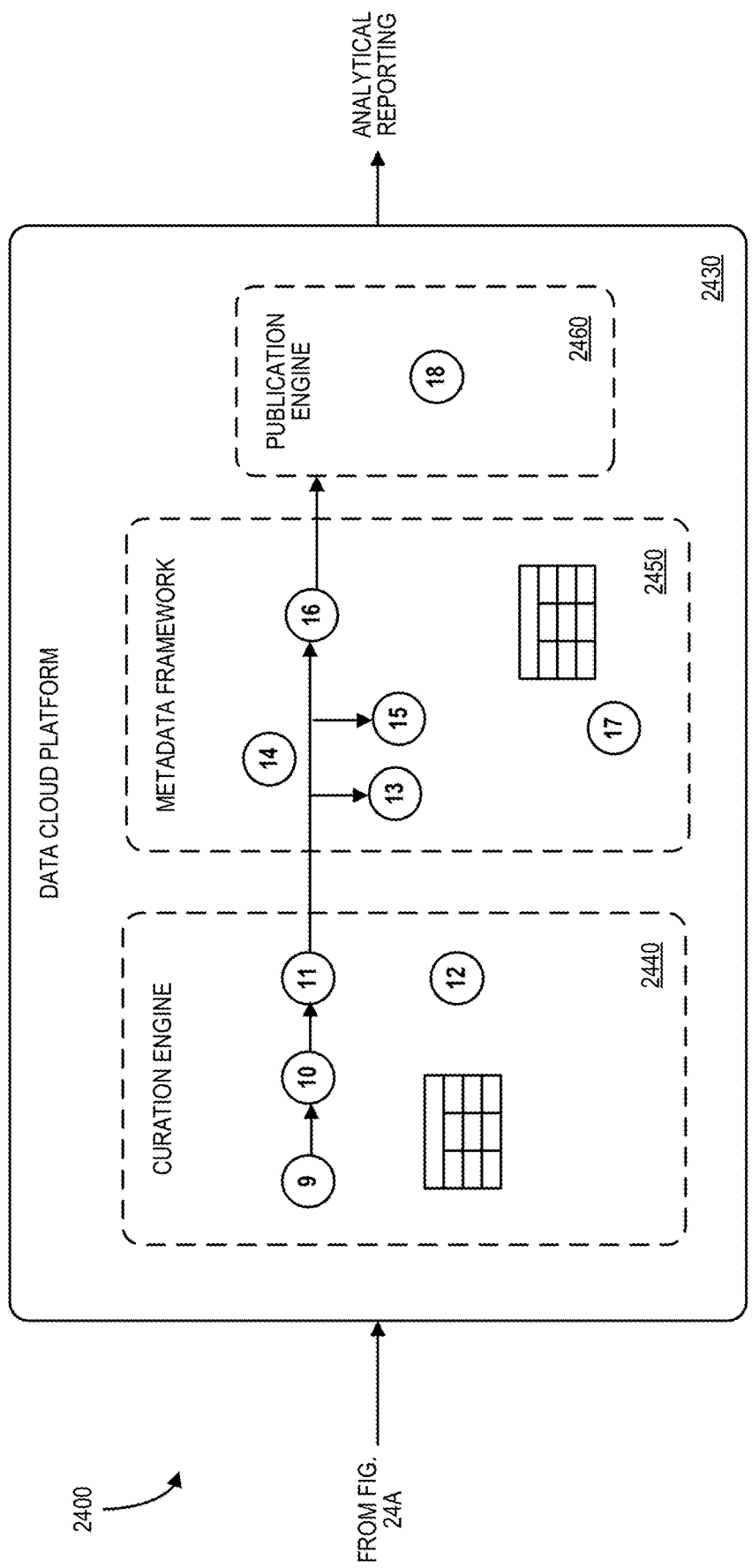

The displays described in connection with FIGS. 4 through 23 may be supported by a cloud-based computing environment. For example, FIGS. 24A and 24B provide an end-to-end data train design and flow 2400 for a cloud-based computing environment according to some embodiments. In particular, FIG. 24A shows an initial portion of the end-to-end data train design and flow 2400 where a cloud management portal 2410 provides information to a cloud computing environment ingestion engine 2420. At (1), events may be loaded into customer tables. At (2), data may be extracted into Simple Storage Service ("S3") via a data fabric (e.g., associated with data integration, data integrity and governance, and application and API integration) and be provided from the cloud management portal 2410 to the cloud computing environment ingestion engine 2420.

At (3), the cloud computing environment ingestion engine 2420 may read through the data set and create Extendible Markup Language ("XML") and/or JavaScript Object Notation ("JSON") files in S3. At (4), the XML and JSON files may be standardized and/or converted. At (5), the source XML and JSON files may be archived in S3. At (6), a single JSON may be merged to a combined JSON based on a schema. At (7), Extract, Transform, Load ("ETL") metadata may be built for data acquisition. At (8), the cloud computing environment ingestion engine 2420 may extract data from S3 to be loaded into a data cloud platform 2430 (FIG. 24B).

FIG. 24B shows a final portion of the end-to-end data train design and flow 2400 including the data cloud platform 2430 comprised of a curation engine 2440, a metadata framework 2450, and a publication engine 2460. At (9), the curation engine 2440 may utilize a stored procedure to read data about a new potential risk relationship customer from an internal table of cloud data. At (10), the curation engine 2440 may process the data read from the internal table to dynamically evolve a schema and create an incremental view of cloud data. At (11), the curation engine 2440 uses the created incremental view to read and output a current batch of cloud data about the new potential risk relationship customer to the metadata framework 2450. At (12), the system may build historical views to read the history data.

At (13), the metadata framework 2450 builds business metadata for curate entities. At (14), the metadata framework 2450 performs a data fabric job build for curate entities. At (15), the metadata framework 2450 may perform a process build along a curate entities build at (16). At (17), the metadata framework 2450 builds ETL metadata for curate entities, and at (18) the publication engine 2450 publishes entities for business consumption (e.g., analytical reporting for various consumers).

Figure 25:
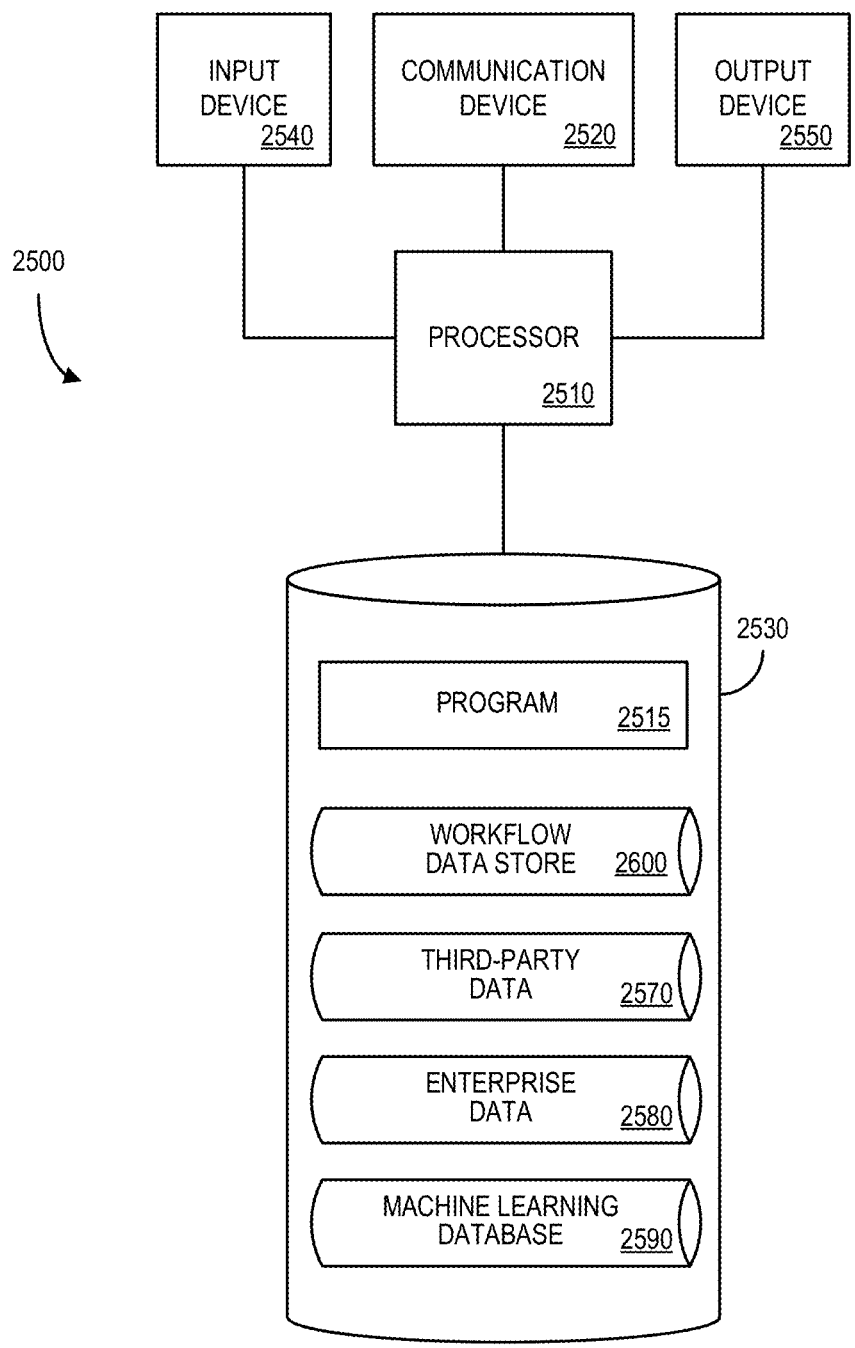
FIG. 25 is a block diagram of an apparatus in accordance with some embodiments of the present invention.

The embodiments described herein may be implemented using any number of different hardware configurations. For example, FIG. 25 illustrates an apparatus 2500 that may be, for example, associated with the system 200 described with respect to FIG. 2. The apparatus 2500 comprises a processor 2510, such as one or more commercially available Central Processing Units ("CPUs") in the form of one-chip microprocessors, coupled to a communication device 2520 configured to communicate via a communication network (not shown in FIG. 25). The communication device 2520 may be used to communicate, for example, with one or more remote third-party business or economic platforms, administrator computers, and/or communication devices (e.g., PCs and smartphones). Note that communications exchanged via the communication device 2520 may utilize security features, such as those between a public internet user and an internal network of an insurance company and/or an enterprise. The security features might be associated with, for example, web servers, firewalls, and/or PCI infrastructure. The apparatus 2500 further includes an input device 2540 (e.g., a mouse and/or keyboard to enter information about data sources, user workflow customization rules or preferences, third-parties, etc.) and an output device 2550 (e.g., to output reports regarding user workflow customizations, machine learning algorithms, alerts, etc.).

The processor 2510 also communicates with a storage device 2530. The storage device 2530 may comprise any appropriate information storage device, including combinations of magnetic storage devices (e.g., a hard disk drive), optical storage devices, mobile telephones, and/or semiconductor memory devices. The storage device 2530 stores a program 2515 and/or an asset allocation analysis tool or application for controlling the processor 2510. The processor 2510 performs instructions of the program 2515, and thereby operates in accordance with any of the embodiments described herein. For example, the processor 2510 may receive, from a remote user device, information about a new potential risk relationship customer (including at least one new user parameter). Based on the new user parameter, the processor 2510 accesses third-party data and utilizes a stored procedure to read data about the new potential risk relationship customer from an internal table of cloud data. The data read from the internal table is processed to dynamically evolve a schema and create an incremental view of cloud data. The processor 2510 server uses the incremental view to read and output a current batch of cloud data. A user interface workflow is then customized via a machine learning algorithm that processes the information about the new potential risk relationship customer, the third-party data, and the current batch of cloud data.

The program 2515 may be stored in a compressed, uncompiled and/or encrypted format. The program 2515 may furthermore include other program elements, such as an operating system, a database management system, and/or device drivers used by the processor 2510 to interface with peripheral devices.

As used herein, information may be "received" by or "transmitted" to, for example: (i) the apparatus 2500 from another device; or (ii) a software application or module within the apparatus 2500 from another software application, module, or any other source.

In some embodiments (such as shown in FIG. 25), the storage device 2530 further stores workflow data store 2600 (e.g., defining an order of user displays, questions included on each user display, etc.), third-party data 2570 (e.g., with third-party user data available from public databases), enterprise data 2580 (e.g., regarding insurance policies, other customers, etc.), and a machine learning database 2590. An example of a database that might be used in connection with the apparatus 2500 will now be described in detail with respect to FIG. 26. Note that the database described herein is only an example, and additional and/or different information may be stored therein. Moreover, various databases might be split or combined in accordance with any of the embodiments described herein. For example, the enterprise data 2580 and machine learning database 2590 might be combined and/or linked to each other within the program 2515.

Figure 26:
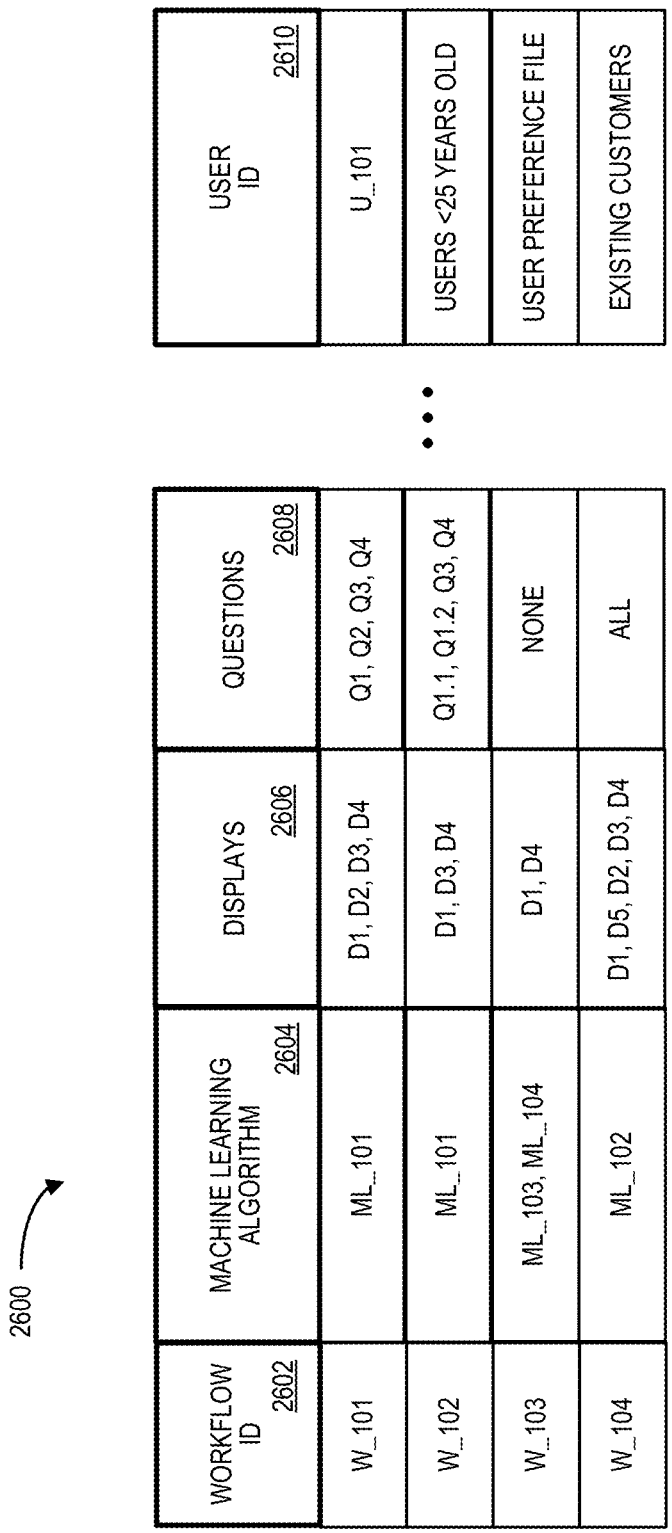
FIG. 26 is a portion of a tabular workflow data store according to some embodiments.

Referring to FIG. 26, a table is shown that represents the workflow data store 2500 that may be stored at the apparatus 2500 according to some embodiments. The table may include, for example, entries associated with data collections workflows that have been customized for users. The table may also define fields 2602, 2604, 2606, 2608, 2610 for each of the entries. The fields 2602, 2604, 2606, 2608, 2610 may, according to some embodiments, specify: a workflow identifier 2602, a machine learning algorithm 2604, displays 2606, questions 2608, and a user identifier 2610. The workflow data store 2600 may be created and updated, for example, based on information electrically received from various operators, administrators, and computer systems (e.g., including when a new user is analyzed, or a workflow is customized for a user) that may be associated with an insurer.

The workflow identifier 2602 may be, for example, a unique alphanumeric code identifying a series of user interface displays that collect information about, for example, one or more properties and/or automobiles to be insured. The machine learning algorithm 2604 may indicate a particular rule or algorithm (e.g., from the machine learning database 2590) that was used to customize the workflow. The displays 2606 may define a series of data collection displays and the questions 2608 may define a series of questions on each display shown to the user. In this way, the displays 2606 and questions 2608 may be used to dynamically and automatically perform customizations for a user, such as:

- which displays are shown to the user;
- the order of displays shown to the user;
- which questions are shown to the user;
- the order of questions shown to the user;
- which questions are included on which displays;
- the wording of particular questions, etc.

The user identifier 2610 may define which user (or users) will experience the customized workflow (and might be associated with user data, user preferences, etc.).

Figure 27:
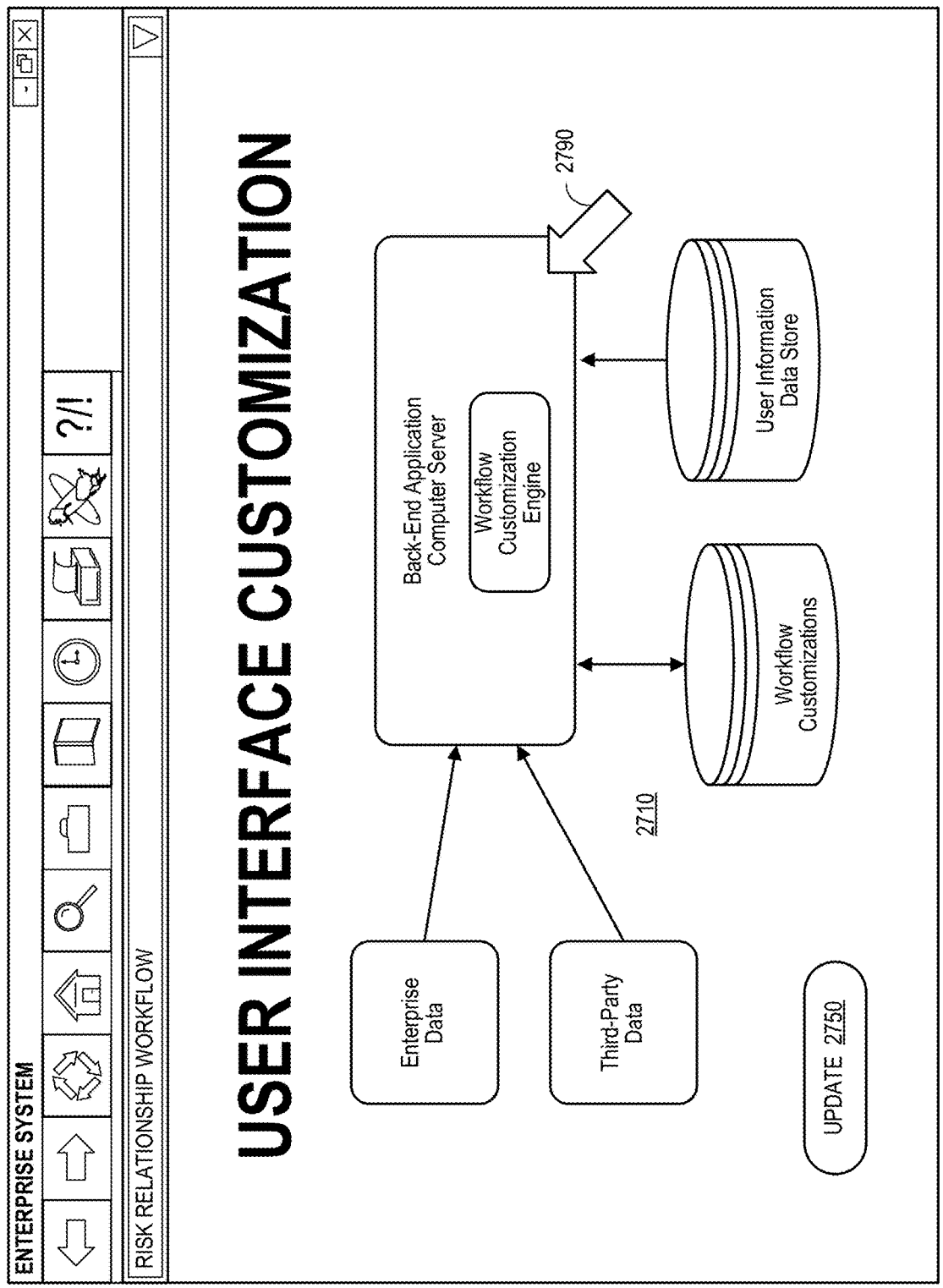
FIG. 27 is an operator or administrator display in accordance with some embodiments.

The operation of the workflow customization system may be controlled via a Graphical User Interface ("GUI"). For example, FIG. 27 is a workflow customization display 2700 including graphical representations of elements of a customization system 2710 according to some embodiments. Selection of a portion or element of the display 2700 might result in the presentation of additional information about that portion or element (e.g., a popup window presenting a data source or result table) or let an operator or administrator enter or annotate additional information about resource allocations (e.g., based on his or her experience and expertise). Selection of an "Update" icon 2750 (e.g., by touchscreen or computer mouse pointer 2790) might cause the customization system 2710 or platform to be re-configured.

Thus, embodiments may provide an automated and efficient way to customize a user interface workflow. Such an approach may improve mobile communications to provide a streamlined experience by adjusting the order of questions and/or flow of interactions with the user. For example, third-party information may let the system eliminate some of the data collection displays that receive information from a customer (because the system already knows the information) and/or reduce the number of questions that need to be included on data collection displays. As a result, the speed of providing an insurance quote to the customer may be substantially reduced. In addition, visual treatments and simplified language may be adjusted to proactively help the user provide relevant information. According to some embodiments, a customized workflow may also facilitate an online-to-offline handoff when appropriate (e.g., shifting the user to a call center or CSR chat feature). These user customizations may focus the interaction on the voice of customer (e.g., can I buy this online, why are you asking me this, shouldn't you know this, what coverage is right for me, what do I do next, etc.).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to specific types of enterprises, embodiments may instead be associated with other types of enterprises in additional to and/or instead of those described herein. Similarly, although certain types of insurance and user parameters were described in connection some embodiments herein, other types of insurance products and/or user parameters might be used instead.

Figure 28:
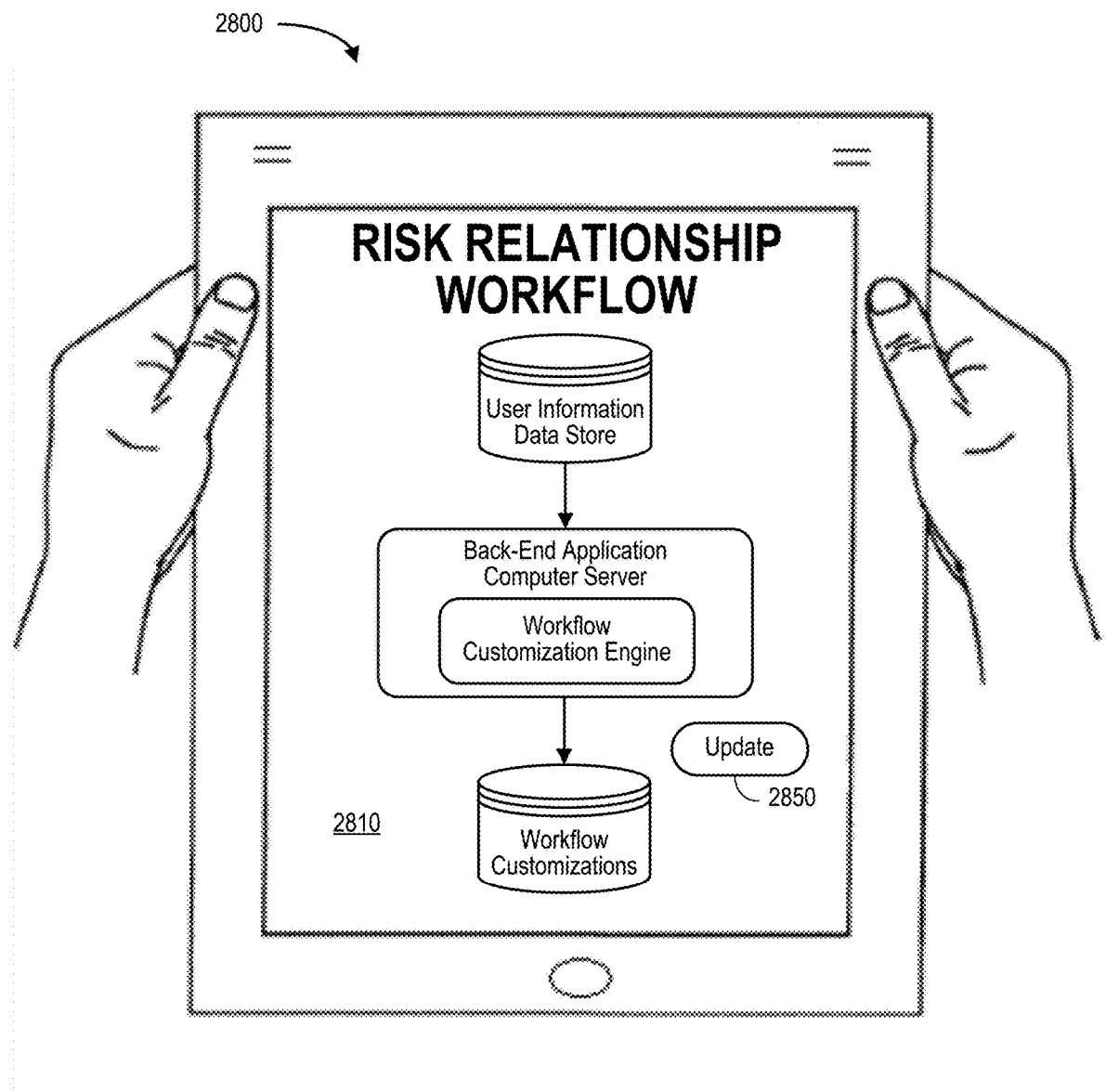
FIG. 28 illustrates a tablet computer with a workflow customization display according to some embodiments.

Note that the displays and devices illustrated herein are only provided as examples, and embodiments may be associated with any other types of user interfaces. For example, FIG. 28 illustrates a tablet computer 2800 with a workflow customization display 2810 according to some embodiments. The workflow customization display 2810 shows elements of a system that might include selectable data that can be modified by a user of the handheld computer 2800 (e.g., via an "Update" icon 2850) to view updated workflow customization configurations associated with an enterprise (e.g., including, in some embodiments, rules associated with third-party data and/or machine learning algorithms). Other embodiments might utilize customized two-way voice interaction workflows with a potential customer (e.g., via a smart home speaker such as the ECHO® smart home speaker and associated ALEXA® interface available from AMAZON®).

Figure 29:
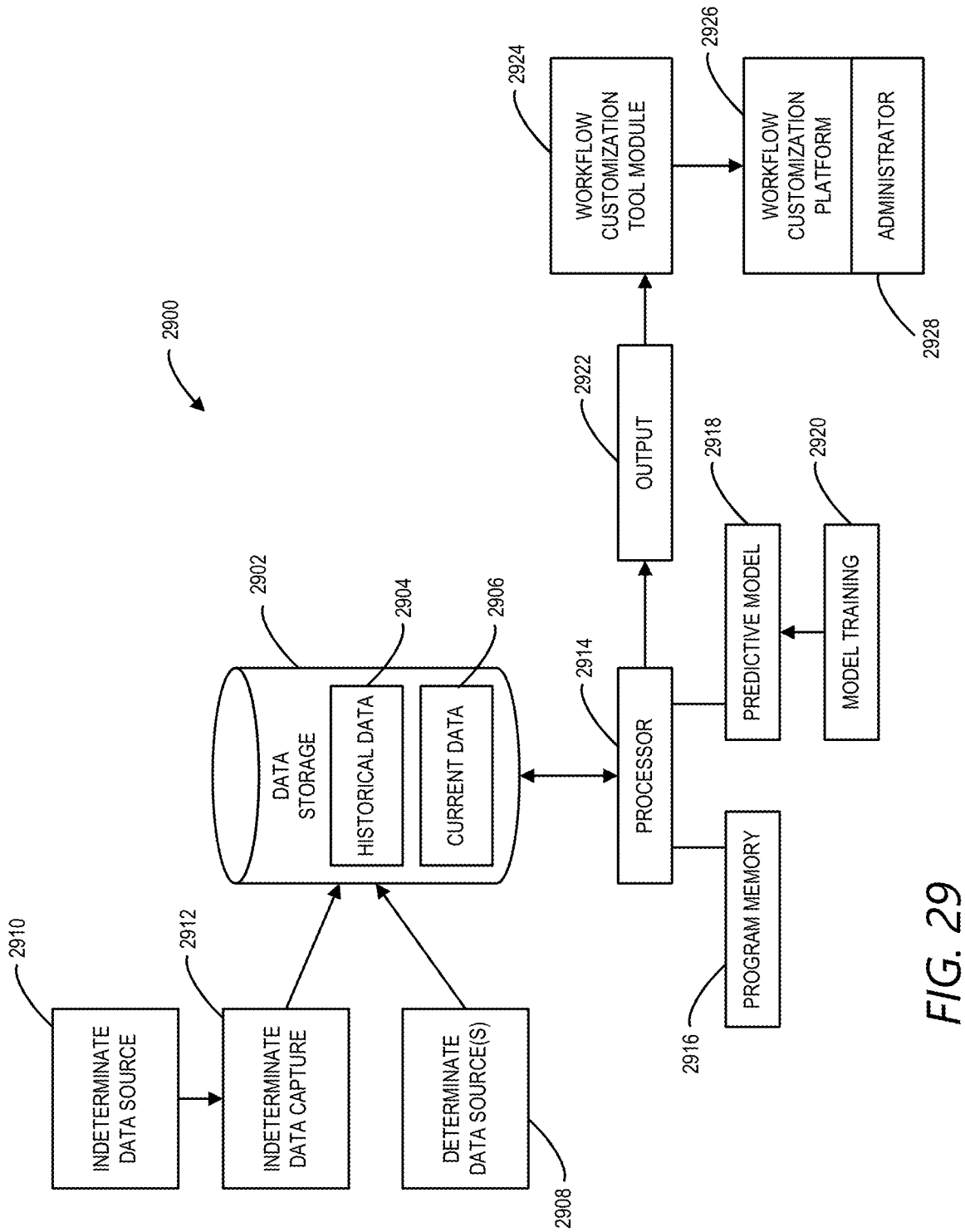
FIG. 29 illustrates a system having a predictive model in accordance with some embodiments.

According to some embodiments, one or more predictive models may be used to customize workflows for a user (e.g., to create workflows in the workflow data store 2600). Features of some embodiments associated with a predictive model will now be described by referring to FIG. 29. FIG. 29 is a partially functional block diagram that illustrates aspects of a computer system 2900 provided in accordance with some embodiments of the invention. For present purposes it will be assumed that the computer system 2900 is operated by an insurance company (not separately shown) for the purpose of supporting automated workflow customizations (e.g., to streamline the collection of information form a user). According to some embodiments, the third-party data 2570 and/or enterprise data 2570 may also be used to supplement and leverage the computer system 2900.

The computer system 2900 includes a data storage module 2902. In terms of its hardware the data storage module 2902 may be conventional, and may be composed, for example, by one or more magnetic hard disk drives. A function performed by the data storage module 2902 in the computer system 2900 is to receive, store and provide access to both historical transaction data (reference numeral 2904) and current transaction data (reference numeral 2906). As described in more detail below, the historical transaction data 2904 is employed to train a predictive model to provide an output that indicates an identified performance metric and/or an algorithm to score or evaluate workflows, and the current transaction data 2906 is thereafter analyzed by the predictive model. Moreover, as time goes by, and results become known from processing current transactions, at least some of the current transactions may be used to perform further training of the predictive model. Consequently, the predictive model may thereby adapt itself to changing conditions.

Either the historical transaction data 2904 or the current transaction data 2906 might include, according to some embodiments, determinate and indeterminate data. As used herein and in the appended claims, "determinate data" refers to verifiable facts such as an age of a home; an automobile type; a policy date or other date; a driver age; a time of day; a day of the week; a geographic location, address or ZIP code; and a policy number.

As used herein, "indeterminate data" refers to data or other information that is not in a predetermined format and/or location in a data record or data form. Examples of indeterminate data include narrative speech or text, information in descriptive notes fields and signal characteristics in audible voice data files, real-time detection of user reactions and mood (is the user bored or annoyed?).

The determinate data may come from one or more determinate data sources 2908 that are included in the computer system 2900 and are coupled to the data storage module 2902. The determinate data may include "hard" data like a claimant's name, date of birth, social security number, policy number, address, an underwriter decision, etc. One possible source of the determinate data may be the insurance company's policy database (not separately indicated).

The indeterminate data may originate from one or more indeterminate data sources 2910 and may be extracted from raw files or the like by one or more indeterminate data capture modules 2912. Both the indeterminate data source(s) 2910 and the indeterminate data capture module(s) 2912 may be included in the computer system 2900 and coupled directly or indirectly to the data storage module 2902. Examples of the indeterminate data source(s) 2910 may include data storage facilities for document images, for text files, and digitized recorded voice files. Examples of the indeterminate data capture module(s) 2912 may include one or more optical character readers, a speech recognition device (i.e., speech-to-text conversion), a computer or computers programmed to perform natural language processing, a computer or computers programmed to identify and extract information from narrative text files, a computer or computers programmed to detect key words in text files, and a computer or computers programmed to detect indeterminate data regarding an individual.

The computer system 2900 also may include a computer processor 2914. The computer processor 2914 may include one or more conventional microprocessors and may operate to execute programmed instructions to provide functionality as described herein. Among other functions, the computer processor 2914 may store and retrieve historical insurance transaction data 2904 and current transaction data 2906 in and from the data storage module 2902. Thus, the computer processor 2914 may be coupled to the data storage module 2902.

The computer system 2900 may further include a program memory 2916 that is coupled to the computer processor 2914. The program memory 2916 may include one or more fixed storage devices, such as one or more hard disk drives, and one or more volatile storage devices, such as RAM devices. The program memory 2916 may be at least partially integrated with the data storage module 2902. The program memory 2916 may store one or more application programs, an operating system, device drivers, etc., all of which may contain program instruction steps for execution by the computer processor 2914.

The computer system 2900 further includes a predictive model component 2918. In certain practical embodiments of the computer system 2900, the predictive model component 2918 may effectively be implemented via the computer processor 2914, one or more application programs stored in the program memory 2916, and computer stored as a result of training operations based on the historical transaction data 2904 (and possibly also data received from a third party). In some embodiments, data arising from model training may be stored in the data storage module 2902, or in a separate computer store (not separately shown). A function of the predictive model component 2918 may be to determine appropriate performance metric scores, scoring algorithms, workflow adjustments, etc. The predictive model component may be directly or indirectly coupled to the data storage module 2902.

The predictive model component 2918 may operate generally in accordance with conventional principles for predictive models, except, as noted herein, for at least some of the types of data to which the predictive model component is applied. Those who are skilled in the art are generally familiar with programming of predictive models. It is within the abilities of those who are skilled in the art, if guided by the teachings of this disclosure, to program a predictive model to operate as described herein.

Still further, the computer system 2900 includes a model training component 2920. The model training component 2920 may be coupled to the computer processor 2914 (directly or indirectly) and may have the function of training the predictive model component 2918 based on the historical transaction data 2904 and/or information about users and user interactions. (As will be understood from previous discussion, the model training component 2920 may further train the predictive model component 2918 as further relevant data becomes available.) The model training component 2920 may be embodied at least in part by the computer processor 2914 and one or more application programs stored in the program memory 2916. Thus, the training of the predictive model component 2918 by the model training component 2920 may occur in accordance with program instructions stored in the program memory 2916 and executed by the computer processor 2914.

In addition, the computer system 2900 may include an output device 2922. The output device 2922 may be coupled to the computer processor 2914. A function of the output device 2922 may be to provide an output that is indicative of (as determined by the trained predictive model component 2918) particular performance metrics and/or user workflows. The output may be generated by the computer processor 2914 in accordance with program instructions stored in the program memory 2916 and executed by the computer processor 2914. More specifically, the output may be generated by the computer processor 2914 in response to applying the data for the current simulation to the trained predictive model component 2918. The output may, for example, be a numerical estimate, a likelihood within a predetermined range of numbers, a defined series of workflow displays, a defined series of workflow questions, etc. In some embodiments, the output device may be implemented by a suitable program or program module executed by the computer processor 2914 in response to operation of the predictive model component 2918.

Still further, the computer system 2900 may include a workflow customization tool module 2924. The workflow customization tool module 2924 may be implemented in some embodiments by a software module executed by the computer processor 2914. The workflow customization tool module 2924 may have the function of rendering a portion of the display on the output device 2922. Thus, the workflow customization tool module 2924 may be coupled, at least functionally, to the output device 2922. In some embodiments, for example, the workflow customization tool module 2924 may direct workflow by referring, to an administrator 2928 via a workflow customization platform 2926, workflows customized and/or generated by the predictive model component 2918 and found to be associated with various users or types of users. In some embodiments, these results may be provided to an administrator 2928 who may also be tasked with determining whether or not the workflows may be improved.

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

What is claimed:

1. A user interface workflow customization system implemented via a back-end application computer server, comprising:
   (a) a user information data store associated with an encrypted database management system and that contains electronic records associated with users, each electronic record including an electronic record identifier and user parameters;
   (b) the back-end application computer server, associated with an enterprise and coupled to the user information data store, including:
      a computer processor, and
      a computer memory, coupled to the computer processor, storing instructions that, when executed by the computer processor, cause the back-end application computer server to:
         receive, from a remote user device, information about a new potential risk relationship customer of an enterprise, including at least one new user parameter,
         based on the new user parameter, access third-party data about the new potential risk relationship customer,
         utilize a stored procedure of a cloud computing environment curation engine to read data about the new potential risk relationship customer from an internal table of cloud data,
         process the data read from the internal table to dynamically evolve a schema and create an incremental view of cloud data,
         use the created incremental view to read and output a current batch of cloud data about the new potential risk relationship customer,
         provide a first user interface workflow associated with all of: an order of questions on a user interface, a wording of questions on the user interface, a selection of questions on the user interface, and an online-to-offline handoff process;
         execute a machine learning algorithm that processes the information about the new potential risk relationship customer, the third-party data, and the current batch of cloud data, wherein an output of the execution is a second user interface workflow, and based on the execution and the third-party data: (i) data collection displays that receive information from the new potential risk relationship customer and are included in the first user interface workflow are eliminated from the second user interface workflow, (ii) a number of questions included on presented data displays included in the first user interface workflow is reduced on the second user interface workflow, and (iii) data elements are prefilled on the user interface associated with the second user interface workflow, wherein avoiding transmission of both the eliminated displays and questions reduces electronic message traffic in a distributed communication network, and reduces an amount of used network messaging bandwidth; and
   (c) a communication port coupled to the back-end application computer server to facilitate an exchange of data with the remote user device, via security features, to support interactive user interface displays that collect information, including user parameters, to be stored in the user information data store in connection with a potential risk relationship.

2. The system of claim 1, wherein the enterprise is an insurer, the risk relationship is a potential insurance policy, and the user interface workflow is associated with at least one of: (i) automobile insurance, (ii) homeowners insurance, and (iii) an insurance bundle.

3. The system of claim 2, wherein the user interface workflow is associated with at least one of: (i) a policy renewal, (ii) a potential insurance claim event, and (iii) insurance claims processing.

4. The system of claim 2, wherein the user interface workflow leads to an insurance premium quote for the new potential insurance policy customer of the insurer.

5. The system of claim 1, wherein the cloud computing environment curation engine receives data from a cloud computing environment ingestion engine.

6. The system of claim 5, wherein the cloud computing environment ingestion engine receives data from a cloud management portal.

7. The system of claim 1, wherein the cloud computing environment curation engine transmits data to a metadata framework.

8. The system of claim 7, wherein the metadata framework transmits data to a data cloud platform publication engine that publishes entities for business consumption.

9. The system of claim 8, wherein the data cloud platform publication engine creates analytical reporting.

10. The system of claim 1, wherein the machine learning algorithm is associated with at least one of: (i) artificial intelligence, (ii) data mining, (iii) optimization, (iv) generalization, (v) supervised learning, (vi) unsupervised learning, (vii) semi-supervised learning, (viii) reinforcement learning, and (ix) dimensionality reduction.

11. A computerized workflow customization method implemented via a back-end application computer server, comprising:
receiving, at the back-end application computer server from a remote user device, information about a new potential risk relationship customer of an enterprise, including at least one new user parameter;
based on the new user parameter, accessing third-party data about the new potential risk relationship customer;
utilizing a stored procedure of a cloud computing environment curation engine to read data about the new potential risk relationship customer from an internal table of cloud data;
processing the data read from the internal table to dynamically evolve a schema and create an incremental view of cloud data;
using the created incremental view to read and output a current batch of cloud data about the new potential risk relationship customer;
providing a first user interface workflow associated with all of: an order of questions on a user interface, a wording of questions on the user interface, a selection of questions on the user interface, and an online-to-offline handoff process;
executing a machine learning algorithm that processes the information about the new potential risk relationship customer, the third-party data, and the current batch of cloud data, wherein an output of the execution is a second user interface workflow, and based on the execution and the third-party data: (i) data collection displays that receive information from the new potential risk relationship customer and are included in the first user interface workflow are eliminated from the second user interface workflow, (ii) a number of questions included on presented data displays included in the first user interface workflow is reduced on the second user interface workflow, and (iii) data elements are prefilled on the user interface associated with the second user interface workflow, wherein avoiding transmission of both the eliminated displays and questions reduces electronic message traffic in a distributed communication network, and reduces an amount of used network messaging bandwidth; and
collecting, via security features, information, including user parameters, via interactive user interface displays, to be stored in a user information data store in connection with a potential risk relationship, wherein the user information data store is associated with an encrypted database management system and the user information data store contains electronic records associated with users, each electronic record including an electronic record identifier and user parameters.

12. The method of claim 11, wherein the enterprise is an insurer, the risk relationship is a potential insurance policy, and the user interface workflow is associated with at least one of:
(i) automobile insurance, (ii) homeowners insurance, and (iii) an insurance bundle.

13. The method of claim 12, wherein the user interface workflow is associated with at least one of: (i) a policy renewal, (ii) a potential insurance claim event, and (iii) insurance claims processing.

14. The method of claim 12, wherein the user interface workflow leads to an insurance premium quote for the new potential insurance policy customer of the insurer.

15. The method of claim 11, wherein the machine learning algorithm is associated with at least one of: (i) artificial intelligence, (ii) data mining, (iii) optimization, (iv) generalization, (v) supervised learning, (vi) unsupervised learning, (vii) semi-supervised learning, (viii) reinforcement learning, and (ix) dimensionality reduction.

16. A non-transitory, computer-readable medium storing instructions, that, when executed by a processor, cause the processor to perform a workflow customization method implemented via a back-end application computer server, the method comprising:
receiving, at the back-end application computer server from a remote user device, information about a new potential risk relationship customer of an enterprise, including at least one new user parameter;
based on the new user parameter, accessing third-party data about the new potential risk relationship customer;
utilizing a stored procedure of a cloud computing environment curation engine to read data about the new potential risk relationship customer from an internal table of cloud data;
processing the data read from the internal table to dynamically evolve a schema and create an incremental view of cloud data;
using the created incremental view to read and output a current batch of cloud data about the new potential risk relationship customer;
providing a first user interface workflow associated with all of: an order of questions on a user interface, a wording of questions on the user interface, a selection of questions on the user interface, and an online-to-offline handoff process;
executing a machine learning algorithm that processes the information about the new potential risk relationship customer, the third-party data, and the current batch of cloud data, wherein an output of the execution is a second user interface workflow, and based on the execution and the third-party data: (i) data collection displays that receive information from the new potential risk relationship customer and are included in the first user interface workflow are eliminated from the second user interface workflow, (ii) a number of questions included on presented data displays included in the first user interface workflow is reduced on the second user interface workflow, and (iii) data elements are prefilled on the user interface associated with the second user interface workflow, wherein avoiding transmission of both the eliminated displays and questions reduces electronic message traffic in a distributed communication network and reduces an amount of used network messaging bandwidth; and
collecting, via security features, information, including user parameters, via interactive user interface displays, to be stored in a user information data store in connection with a potential risk relationship, the user information data store associated with an encrypted database management system, and wherein the user information data store contains electronic records associated with users, each electronic record including an electronic record identifier and user parameters.

17. The medium of claim 16, wherein the enterprise is an insurer, the risk relationship is a potential insurance policy, and the user interface workflow is associated with at least one of:
(i) automobile insurance, (ii) homeowners insurance, and (iii) an insurance bundle.

18. The medium of claim 17, wherein the user interface workflow is associated with at least one of: (i) a policy renewal, (ii) a potential insurance claim event, and (iii) insurance claims processing.

\* \* \* \* \*